United States Patent
Morishima et al.

(10) Patent No.: US 6,203,876 B1
(45) Date of Patent: *Mar. 20, 2001

(54) INFORMATION RECORDING MEDIUM

(75) Inventors: Shinnichi Morishima; Koji Wariishi; Toshio Ishida; Michihiro Shibata, all of Kanagawa (JP)

(73) Assignee: Fuji Photo Film Co., Ltd., Kanagawa (JP)

( * ) Notice: Subject to any disclaimer, the term of this patent is extended or adjusted under 35 U.S.C. 154(b) by 0 days.

This patent is subject to a terminal disclaimer.

(21) Appl. No.: 09/231,970

(22) Filed: Jan. 15, 1999

Related U.S. Application Data

(63) Continuation-in-part of application No. 08/896,954, filed on Jul. 18, 1997, now Pat. No. 5,879,772.

(30) Foreign Application Priority Data

| Jul. 18, 1996 | (JP) | 8-189819 |
| Sep. 26, 1996 | (JP) | 8-273956 |
| Feb. 28, 1997 | (JP) | 9-61780 |

(51) Int. Cl.$^7$ .................................... B32B 3/02
(52) U.S. Cl. ................ 428/64.1; 428/64.4; 428/64.8; 428/913; 430/270.16; 430/495.1; 430/945; 369/283; 369/288
(58) Field of Search ............... 428/64.1, 64.2, 428/64.4, 64.7, 64.8, 913; 430/270.14, 270.15, 270.16, 495.1, 945; 369/283, 288

(56) References Cited

U.S. PATENT DOCUMENTS 5,579,150 * 11/1996 Cho et al. ......................... 359/241

FOREIGN PATENT DOCUMENTS

| 0192778A1 | * | 9/1986 | (EP) . |
| 0238759A2 | * | 9/1987 | (EP) . |
| 0272933A2 | * | 6/1988 | (EP) . |
| 2217910 | * | 9/1986 | (GB) . |
| 6364794 | * | 9/1986 | (JP) . |

OTHER PUBLICATIONS

JP–63064794 A, Derwent Publications Ltd., Section Ch Week 8818, Mar. 1988.*

JP–61175083 A, Derwent Publications Ltd., Section Ch, Week 8638, Aug. 1986.*

JP–01067731 A, Derwent Publications Ltd., Section Ch, Week 8916, Mar. 1989.*

JP–01030791 A, Derwent Publications Ltd., Section Ch, Week 8911, Feb. 1989.*

* cited by examiner

*Primary Examiner*—Elizabeth Evans
(74) *Attorney, Agent, or Firm*—Sughrue, Mion, Zinn, Macpeak & Seas, PLLC

(57) ABSTRACT

An information recording medium composed of 1) a transparent support, 2) a recording layer which is composed of an organic dye having an oxidation potential in terms of $P_o$ and an organic oxidizing agent having a reduction potential in terms of $P_r$ in which the oxidation potential and the reduction potential satisfy the condition of $0.4V<P_o-P_r<1.0V$, and 3) a light-reflecting layer on the recording layer shows improved light-resistance and endurance as well as good recording and reproducing characteristics.

10 Claims, No Drawings

INFORMATION RECORDING MEDIUM

This is a continuation-in-part of application Ser. No. 08/896,954, filed Jul. 18, 1997 now U.S. Pat. No. 5,879,772 issued Mar. 9, 1999.

FIELD OF THE INVENTION

This invention relates to an information recording medium on which information can be recorded by means of a laser beam having a high energy density.

BACKGROUND OF THE INVENTION

The information recording medium, namely, optical disc or compact disc (CD), on which information can be recorded by means of a laser beam has been recently developed. At present, the information recording medium is utilized, for instance, as a video disc, an audio disc, a large capacity filing means for storing a still picture, a large capacity computer data-disc. Among the known compact discs, a recordable compact disc (CD-R), which is also named a compact disc of Direct-Read-After-Write (DRAW) type is paid much attention, because it is expected to be appropriately employable for computer data storage. The CD-R has an advantage in that computer data can be easily stored using a CD-R recording device to produce a data recorded medium.

The optical disc of CD-R type generally comprises a disc-shaped substrate and a recording layer provided thereon. The disc substrate comprises glass or synthetic resin. The recording layer comprises a metal or a semi-metal such as Bi, Sn, In or Te, or alternatively a dye such as a cyanine dye, a metal-complex dye, or a quinone dye. An intermediate layer of polymer material may be arranged between the substrate and the recording layer, whereby increasing smoothness of the surface of substrate, increasing adhesion between the substrate and the recording layer, or increasing sensitivity of the recording layer.

On the CD-R, the writing (recording) and reading (reproducing) can be performed in the following manner. The laser beam modulated by information is applied to the recording layer of the CD-R through the substrate. The recording layer alters its optical characteristics in the area where the laser beam has been applied, to produce a chemical or physical change such as production of pit. The reading of the recorded information can be performed by sequentially applying a laser beam on the recording layer of the CD-R through the substrate and detecting a light reflected on the CD-R.

At present, most of the recording layer of CD-R utilizes a light-sensitive dye as the recording material, because the recording dye layer can be easily formed by s coating method and shows a high sensitivity, as compared with the recording metal layer. However, the dye layer has such disadvantages as low light refection, low C/N of reproduction signal, low light resistance, and poor durability.

Japanese Patent Provisional Publication No. 64-40382 describes that an optical disc having a recording layer of a cyanine dye which has a benzoindolenine skeleton shows high light reflection and enhanced C/N.

Japanese Patent Provisional Publication No. 64-40387 describes an optical disc having a recording layer of a combination of a dicarbocyanine dye (having 5 methine units) having a benzoindolenine skeleton (i.e., structure in which a benzene ring is fused with the indolenine skeleton) and a tricarbocyanine dye (having 7 methine units) having an indolenine skeleton. The recording layer of this type utilizes a high light reflection of the dicarbocyanine dye having benzoindolenine skeleton and a high C/N of the tricarbocyanine dye having the indolenine skeleton.

Nikkei Electronics (in the Japanese language, page 107, issued on Jan. 23, 1989) describes a provision of a light-reflecting layer on the recording dye layer. This publication further describes that the dye of the recording layer melts in the laser beam-applied area and the plastic substrate on the area protrudes into the melted recording layer, whereby a pit is produced on that area.

Although a number of studies have been made on the recording layer of light-sensitive dye type, light resistances of the known dyes are still not satisfactory. For this reason, a singlet oxygen quencher is generally combined with the light-sensitive dye.

Japanese Patent Provisional Publication H2-300288 describes an optical disc having a recording layer which comprises a cyanine dye and a nitroso compound and is stated to be enhanced its light-resistance. Japanese Patent Provisional Publication H4-146189 describes an optical disc having a recording layer which comprises a combination of a dicarbocyanine dye (containing five methine units) and a nickel complex compound and is stated to show enhanced light resistance. These combinations utilize the known singlet oxygen quenchers such as the nitroso compound and the nickel complex compound, whereby the light-resistance of the cyanine dye is increased. The use of the nitroso compound, however, has a disadvantageous feature. In more detail, if the nitroso compound should be used in a great amount if the light-resistance is desired to effectively increase. However, the use of a great amount of the nitroso compound unfavorably decreases light reflection. The nickel complex compound, namely, a heavy metal-containing compound, may cause environmental pollution.

Japanese Patent Provisional Publication No. 63-64794 proposes a light information recording medium having a recording layer which comprises a cyanine dye and an electron-acceptable compound and is stated to show improved light-resistance. An example of the cyanine dye is a tricarbocyanine dye (containing seven methine units) having a benzoindolenine skeleton. Examples of the electron-acceptable compounds are tetracyanoqunodimethane (TCNQ) and tetracyanoethylene. The combination of the disclosed cyanine dye and electron-acceptable compound, however, has been found to be still not satisfactory in the light-resistance. Particularly, the light-resistance after the information is recorded, that is, archival light-resistance, is unsatisfactory.

Accordingly, it is an object of the present invention to provide a light information recording medium showing high light-resistance and high durability, as well as high recording and reproducing characteristics.

Particularly, it is an object of the invention to provide a light information recording medium of CR-R type which shows sufficient light-resistance and durability even after the information is recorded.

SUMMARY OF THE INVENTION

This invention resides in an information recording medium comprising a transparent support, a recording layer on the support which comprises an organic dye having an oxidation potential in terms of $P_o$ and an organic oxidizing agent having a reduction potential in terms of $P_r$ in which the oxidation potential and the reduction potential satisfy the condition of $0.4V < P_o - P_r < 1.0V$, and a light-reflecting layer on the recording layer.

The invention further resides in an information recording medium comprising a transparent support, a recording layer on the support which comprises an organic dye having an oxidation potential in terms of $P_o$ under the condition of $0.4V<P_o<1.0V$ and an organic oxidizing agent having a reduction potential in terms of $P_r$ which is $-0.2V<P_r$, preferably $-0.2V<P_r<0.2V$, more preferably $-0.1V<P_r<0.05V$, and a light-reflecting layer on the recording layer, in which $P_o$ and $P_r$ have the relationship of $0.4V<P_o-P_r<1.0V$.

The reduction potential $P_r$ of the organic oxidizing agent means a potential at which the organic oxidizing agent is reduced by receiving electron on the cathode according to voltammetry. The oxidation potential $P_o$ of the organic dye means a potential at which the organic dye is oxidized by releasing electron on the anode according to voltammetry. Thus, the oxidation potential and the reduction potential can be accurately determined by the know voltammetry. In more detail, a voltammogram is measured for $1 \times 10^{-3}$ M of the organic oxidizing agent in acetonitrile containing 0.1 M of tetra-n-ethyl ammonium perchlorate (i.e., supporting electrolyte), and a half-wave potential is determined from the voltammogram. In the measurement, platinum is used as working electrode and a saturated calomel electrode (SCE) is used as reference electrode. The measurement is made at 25° C.

The invention further resides in an information recording medium comprising a transparent support, a recording layer on the support which comprises an organic dye and an organic oxidizing agent having a reduction potential in terms of $P_r$ which is $-0.2V<P_r$, preferably $-0.2V<P_r<0.2V$, more preferably $-0.1V<P_r<0.05V$ and having an absorption maximum wavelength shorter than that of the organic dye by at least 50 nm, preferably by not shorter than 100 nm but not longer than 300 nm, more preferably by not shorter than 150 nm but not longer than 300 nm, most preferably by not shorter than 200 nm but not longer than 300 nm, and a light-reflecting layer on the recording layer.

PREFERRED EMBODIMENTS OF THE INVENTION

The organic oxidizing agent preferably is a compound of a carbon ring or a hetero-atom ring having plural double bonds on the ring. The ring can comprise carbon, nitrogen, oxygen, sulfur and/or selenium.

The organic oxidizing agent preferably has the following formula (A):

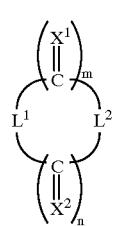

(A)

in which each of $X^1$ and $X^2$ independently represents an oxygen atom, a sulfur atom, $=NR^1$ group, or $=CR^2R^3$, each of $R^1$, $R^2$ and $R^3$ independently being a hydrogen atom, a halogen atom, or a substituent comprising at least two atoms selected from the group consisting of hydrogen, halogen, carbon, oxygen, nitrogen and sulfur; each of $L^1$ and $L^2$ independently represents a divalent linking group; and each of m and n independently represents an integer of 0 to 3, under the condition of $m+n \geq 2$.

Examples of the halogen atoms include a fluorine atom, a chlorine atom, and a bromine atom.

Examples of the substituents represented by $R^1$, $R^2$ and $R^3$ include various groups such as alkyl, alkenyl, aralkyl, aryl, hetero-ring, cyano, nitro, mercapto, hydroxyl, alkoxy, aryloxy, alkylthio, arylthio, acyloxy, amino, alkylamino, amide, sulfonamide, sulfamoylamino, alkoxycarbonylamino, alkoxysulfonylamino, ureido, thioureido, acyl, alkoxycarbonyl, carbamoyl, alkylsulfonyl, alkylsulfinyl, sulfamoyl, carboxyl (including its salt), and sulfo (including its salt). These substituents can have one or more substituents.

The substituents represented by $R^1$, $R^2$ and $R^3$ are further described below.

The alkyl group preferably has 1 to 18 (more preferably 1 to 6) carbon atoms and can be of straight chain, branched chain, and cyclic, which can have one or more substituents such as above. Examples of the alkyl groups include methyl, ethyl, propyl, isopropyl, t-butyl, cyclopentyl, cyclohexyl, 2-hydroxyethyl, 3-hydroxypropyl, 4-hydroxybutyl, 3-methoxypropyl, 2-aminoethyl, acetoamidemethyl, 2-acetoamidethyl, carboxymethyl, 2-carboxyethyl, 2-sulfoethyl, ureidanethyl, 2-ureidoethyl, carbamoylmethyl, 2-carbamoylethyl, 3-carbamoylpropyl, pentyl, hexyl, octyl, decyl, undecyl, dodecyl, hexadecyl, and octadecyl.

The alkenyl group preferably has 2 to 18 (more preferably 2 to 6) carbon atoms and can be of straight chain, branched chain, and cyclic. Examples of the alkenyl groups include vinyl, allyl, 1-propenyl, 2-pentenyl, 1,3-butadienyl, 2-octenyl and 3-dodecenyl.

The aralkyl group preferably has 7 to 10 carbon atoms and may be benzyl.

The aryl group preferably has 6 to 10 carbon atoms and may have one or more substituents such as above. Examples of the aryl group include phenyl, naphthyl, p-dibutylaminophenyl and p-methoxyphenyl.

The hetero ring group preferably is a 5- or 6-membered saturated or unsaturated hetero ring group comprising carbon, nitrogen, oxygen and/or sulfur atoms as the ring members. One or more hetero atoms can be included in the ring. Examples of the hetero ring groups include furyl, benzofuryl, pyranyl, pyrrolyl, imidazolyl, iso-oxazolyl, pirazolyl, benzotriazolyl, pyridyl, pyrimidyl, pyridazinyl, thienyl, indolyl, quinolyl, phthalazinyl, quinoxalinyl, pyrrolidinyl, pyrrolinyl, imidazolidinyl, pyrazolidinyl, piperidinyl, piperadinyl, indolinyl, and morpholinyl.

The alkoxy group preferably has 1 to 18 (more preferably 1 to 6) carbon atoms and may have one or more substituents such as above. Examples of the alkoxy groups include methoxy, ethoxy, propoxy, isopropoxy, butoxy, 2-methoxyethoxy, 2-methanesulfonylethoxy, pentyloxy, hexyloxy, octyloxy, undecyloxy, dodecyloxy, hexadecyloxy and octadecyloxy.

The aryloxy group preferably has 6 to 10 carbon atoms and may have one or more substituents such as above. Examples of the aryloxy groups include phenoxy and p-methoxyphenoxy.

The alkylthio group preferably has 1 to 18 (more preferably 1 to 6) carbon atoms. Examples of the alkylthio groups include methylthio, ethylthio, octylthio, undecylthio, dodecylthio, hexadecylthio and octadecylthio.

The arylthio group preferably has 6 to 10 carbon atoms and may have one or more substituents such as above. Examples of the arylthio groups include phenylthio and 4-methoxyphenylthio.

The acyloxy group preferably has 1 to 18 (more preferably 1 to 6) carbon atoms. Examples of the acyloxy groups include acetoxy, propanoyloxy, pentanoyloxy, octanolyloxy, dodecanoyloxy and octadecanoyloxy.

The alkylamino group preferably has 1 to 18 (more preferably 1 to 6) carbon atoms. Examples of the alkylamino groups include methylamino, dimethylamino, diethylamino, dibutylamino, octylamino, dioctylamino and undecylamino.

The amide group preferably has 1 to 18 (more preferably 1 to 6) carbon atoms. Examples of the amide groups include acetamide, acetylmethylamino, acetyloctylamino, acetyldecylamino, acetylundecylamino, acetyloctadecylamino, propanoylamino, pentanolylamino, octanolylamino, octanoylmethylamino, dodecanolylamino, dodecanolylmethylamino and octadecanoylamino.

The sulfonamide group preferably has 1 to 18 (more preferably 1 to 6) carbon atoms and may have one or more substituents such as above. Examples of the sulfonamide groups include methanesulfonamide, ethanesulfonamide, propylsulfonamide, 2-methoxyethylsulfonamide, 3-aminopropylsulfonamide, 2-acetamideethylsulfonamide, octylsulfonamide and undecylsulfonamide.

The alkoxycarbonylamino group preferably has 2 to 18 (More preferably 2 to 6) carbon atoms. Examples of the alkoxycarbonylamino groups include methoxycarbonylamino, ethoxycarbonylamino, octyloxycarbonylamino and undecyloxycarbonylamino.

The alkoxysulfonylamino group preferably has 1 to 18 (more preferably 1 to 6) carbon atoms. Examples of the alkoxysulfonylamino groups methoxysulfonylamino, ethoxysulfonylamino, octyloxysulfonylamino and undecyloxysulfonylamino.

The sulfamoylamino group preferably has 0 to 18 (more preferably 0 to 6) carbon atoms. Examples of the sulfamoylamino groups include methylsulfamoylamino, dimethylsulfamoylamino, ethylsulfamoylamino, propylsulfamoylamino, octylsulfamoylamino and undecylsulfamoylamino.

The ureido group preferably has 1 to 18 (more preferably 1 to 6) carbon atoms and may have one or more substituents such as above. Examples of the ureido groups include ureido, methylureido, N,N-dimethylureido, octylureido and undecylureido.

The thioureido group preferably has 1 to 18 (more preferably 1 to 6) carbon atoms and may have one or more substituents such as above. Examples of the thioureido groups include thioureido, methylthioureido, N,N-dimethylthioureido, octylthioureido and undecylthioureido.

The acyl group preferably has 1 to 18 (more preferably 1 to 6) carbon atoms. Examples of the acyl groups include acetyl, benzoyl, octanoyl, decanoyl, undecanoyl and octadecanoyl.

The alkoxycarbonyl group preferably has 2 to 18 (more preferably 2 to 6) carbon atoms. Examples of the alkoxycarbonyl groups include methoxycarbonyl, ethoxycarbonyl, octyloxycarbonyl and undecyloxycarbonyl.

The carbamoyl group preferably has 1 to 18 (more preferably 1 to 6) carbon atoms. Examples of the carbamoyl groups include carbamoyl, N,N-dimethylcarbamoyl, N-ethylcarbamoyl, N-octylcarbamoyl, N,N-dioctylcarbamoyl and N-undecylcarbamoyl.

The alkylsulfonyl group preferably has 1 to 18 (more preferably 1 to 6) carbon atoms. Examples of the alkylsulfonyl groups include methanesulfonyl, ethanesulfonyl, 2-chloroethanesulfonyl, octanesulfonyl and undecanesulfonyl.

The alkylsulfinyl group preferably has 1 to 18 (more preferably 1 to 6) carbon atoms. Examples of the alkylsulfonyl groups include methanesulfinyl, ethanesulfinyl and octanesulfinyl.

The sulfamoyl group preferably has 0 to 18 (more preferably 0 to 6) carbon atoms and may have one or more substituents such as above. Examples of the sulfamoyl groups include sulfamoyl, dimethylsulfamoyl, ethylsulfamoyl, octylsulfamoyl, dioctylsulfamoyl and undecylsulfamoyl.

Each of $L^1$ and $L^2$ independently represents a divalent linking group. The divalent linking group comprises carbon, nitrogen, oxygen and/or sulfur as the ring member atoms and constitutes 4- to 8-membered ring in conjunction with the carbon atoms to which $X^1$ and $X^2$ are attached. Examples of the groups represented by $L^1$ and $L^2$ include —C($R^6$)($R^7$)—, —C($R^8$)=, —N($R^9$)—, —N=, —O—, and —S—, singly or in combination, in which each of $R^6$, $R^7$, $R^8$ and $R^9$ independently represents a hydrogen atom or a substituents such as those described hereinbefore for $R^1$, $R^2$ and $R^3$. The 4- to 8-membered ring may have a saturated or unsaturated ring which is fused to the 4- to 8-membered ring. The fused ring can be a cycloalkyl ring, an aryl ring, or a hetero ring. The examples of these rings can be referred to those described for $R^1$, $R^2$ and $R^3$.

The above-mentioned 4- to 8-membered ring is further described below.

Examples of the 4-membered rings include cyclobutanedione, cyclobutenedione and benzocyclobutenequinone.

Examples of the 5-membered rings include cyclopentanedione, cyclopentenedione, cyclopentanetrione, cyclopentenetrione, indanedione, indanetrione, tetrahydrofurandione, tetrahydrofurantrione, tetrahydropyrroledione, tetrahydrcpyrroletrione, tetrahydrothiophenedione and tetrahydrothicphenetrione.

Examples of the 6-membered rings include benzoquinone, quinomethane, quinodimethane, quinonimine, quinonediimine, thiobenzoquinone, dithiobenzoquinone, naphthoquinone, anthraquinone, dihydrochranenetrione, dihydropyridinedione, dihydropyrazinedione, dihydropyrimidinedione, dihydropyridazinedione, dihyrophthalazinedione, dihydroisoquinolinedione, and tetrahydroquinolinetrione.

Examples of the 7-membered rings include cycloheptanedione, cycloheptanetrione, azacycloheptanetrione, diazacyclobutanetrione, oxocycloheptanetrione, dioxocycloheptanetrione, and oxoazacycloheptanetrione.

Examples of the 8-membered rings include cyclootanedione, cyclooctanetrione, azacyclooctanetrione, diazacyclootanetrione, oxocyclooctanetrione, dioxocyclooctanetrione, oxoazacyclooctanetrione, cyclooctenedione, cyclooctadienedione, and dibenzocyclooctenedione.

The preferred ring formed of $L^1$ and $L^2$ in conjunction with the carbon atoms to which $X^1$ and $X^2$ are attached is the 6-membered ring.

The organic oxidizing agent more preferably is a compound having the following formula (A-I):

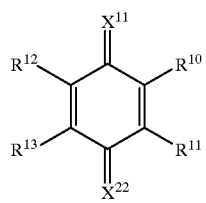

(A-I)

in which each of $R^{10}$, $R^{11}$, $R^{12}$, and $R^{13}$ independently represents a hydrogen atom or a substituent group. In the case where the combination of $R^{10}$ and $R^{11}$ or $R^{12}$ and $R^{13}$ is a substituent group, these may be combined to form an unsaturated condensed ring. The unsaturated condensed ring may have one or more substituents such as those described for $R^1$ to $R^3$.

Each of $X^{11}$ and $X^{12}$ independently represents one of those described for $X^1$ and $X^2$ of the formula (A). Preferred for each of $X^{11}$ and $X^{12}$ is an oxygen atom or the group of $=C(R^2)(R^3)$. Each of $R^2$ and $R^3$ independently is halogen, cyano, acyl, alkoxycarbonyl, or alkylsulfonyl. The $X^{11}$ and $X^{12}$ preferably are the same oxygen atoms or the groups of $=C(R^2)(R^3)$ in the compound.

The case in which $X^{11}$ and $X^{12}$ are both oxygen atoms is described below.

In the case where $X^{11}$ and $X^{12}$ are both oxygen atoms, at least two of $R^{10}$, $R^{11}$, $R^{12}$ and $R^{13}$ preferably are electron-attracting groups. The electron-attracting groups mean groups whose Hammett's σ value is positive. Examples of the electron-attracting groups include halogen atom, cyano, acyl, alkoxycarbonyl, carbamoyl, alkylsulfonyl and alkylsulfinyl.

In the case where $X^{11}$ and $X^{12}$ are both oxygen atoms, each of $R^{10}$, $R^{11}$, $R^{12}$ and $R^{13}$ independently is hydrogen, alkyl, halogen, cyano, nitro, alkoxy, alkylthio, amino, alkylamino, amide, sulfonamide, sulfamoylamino, alkoxycarbonylamino, alkoxysulfonylamino, ureido, thioureido, acyl, alkoxycarbonyl, carbamoyl, alkylsulfonyl, alkylsulfinyl, or sulfamoyl, under the condition that at least two of $R^{10}$, $R^{11}$, $R^{12}$ and $R^{13}$ are the electron-attracting groups. More preferably, each of $R^{10}$, $R^{11}$, $R^{12}$ and $R^{13}$ independently is hydrogen, alkyl having 1 to 6 carbon atoms, halogen, cyano, alkoxy having 1 to 6 carbon atoms, alkylthio having 1 to 6 carbon atoms, amide having 1 to 6 carbon atoms, sulfonamide having 1 to 6 carbon atoms, ureido having 1 to 6 carbon atoms, acyl having 1 to 6 carbon atoms, alkoxycarbonyl having 1 to 6 carbon atoms, carbamoyl having 1 to 6 carbon atoms, alkylsulfonyl having 1 to 6 carbon atoms, or alkylsulfinyl having 1 to 6 carbon atoms, under the condition that at least two of $R^{10}$, $R^{11}$, $R^{12}$ and $R^{13}$ are halogen, cyano, alkylsulfonyl or alkylsulfinyl.

In the case that $X^{11}$ and $X^{12}$ are the same $=C(R^2)(R^3)$ groups, the organic oxidizing agent is preferably represented by the formula (A-II):

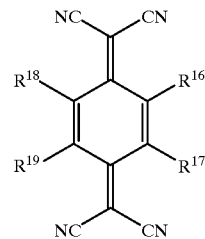

(A-II)

in which each of $R^{16}$, $R^{17}$, $R^{18}$, and $R^{19}$ has the same meaning as that described hereinbefore for $R^{10}$ to $R^{13}$.

The organic oxidizing agent is more preferably represented by the formula (A-III) or (A-IV):

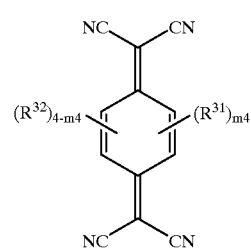

(A-III)

in which $R^{31}$ represents halogen, cyano, alkoxy, alkylthio, amide, sulfonamide, ureido, acyl, or alkoxycarbonyl; $R^{32}$ has the same meaning as that described hereinbefore for $R^1$ to $R^3$; m4 is an integer of 1 to 4; and when m4 and me−m4 correspond to integers of 2 or more, plural $R^{31}$ and $R^{32}$ can be the same or different from each other.

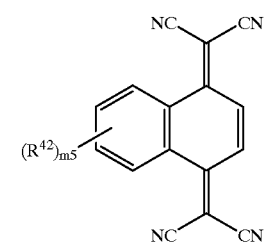

(A-IV)

in which $R^{42}$ represents a hydrogen atom or a substituent group. The $R^{42}$ has the same meaning as that described hereinbefore for $R^1$ to $R^3$; m5 is an integer of 0 to 6; and when m5 corresponds to an integer of 2 or more, plural $R^{42}$ can be the same or different from each other.

In the compound of the formula (A-III), $R^{31}$ and $R^{32}$ preferably are as follows: $R^{31}$ is halogen, cyano, alkoxy having 1 to 6 carbon atoms, acyl having 1 to 8 carbon atoms, or alkoxycarbonyl having 2 to 6 carbon atoms, and $R^{32}$ is hydrogen or alkyl having 1 to 6 carbon atoms.

More preferably, the organic oxidizing agent of the formula (A-III) is represented by the following compound:

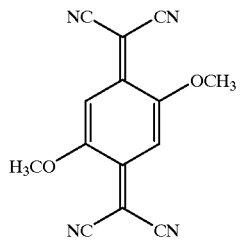

In the formula (A-IV), $R^{42}$ preferably is hydrogen, alkyl, halogen, cyano, alkoxy, alkylthio, amide, sulfonamide, ureido, or acyl, more preferably, hydrogen, alkyl having 1 to 6 carbon atoms, halogen, cyano, alkoxy having 1 to 6 carbon atoms, alkylthio having 1 to 6 carbon atoms, amide having 1 to 6 carbon atoms, sulfonamide having 1 to 6 carbon atoms, ureido having 1 to 6 carbon atoms, or acyl having 1 to 6 carbon atoms, particularly preferably, hydrogen, alkyl having 1 to 6 carbon atoms, fluorine, chlorine, bromine, cyano, or alkoxy having 1 to 6 carbon atoms, and most preferably hydrogen.

No limitative examples for the organic oxidizing agents of the invention are described below:

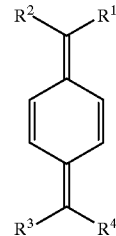

| No. | $R^1$ | $R^2$ | $R^3$ | $R^4$ |
|---|---|---|---|---|
| A-1 | CN | $CO_2CH_3$ | CN | $CO_2CH_3$ |
| A-2 | CN | $CO_2C_4H_9$ | CN | $CO_2C_4H_9$ |
| A-3 | CN | $CO_2C_{11}H_{23}$ | CN | $CO_2C_{11}H_{23}$ |
| A-4 | $CO_2C_2H_5$ | $CO_2C_2H_5$ | $CO_2C_2H_5$ | $CO_2C_2H_5$ |
| A-5 | Cl | Cl | Cl | Cl |
| A-6 | $COCH_3$ | $COCH_3$ | $COCH_3$ | $COCH_3$ |
| A-7 | $SO_2C_2H_5$ | $SO_2C_2H_5$ | $SO_2C_2H_5$ | $SO_2C_2H_5$ |

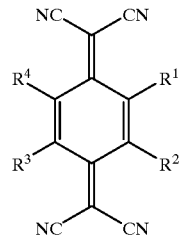

| No. | $R^1$ | $R^2$ | $R^3$ | $R^4$ |
|---|---|---|---|---|
| A-8 | H | H | H | H |
| A-9 | F | F | F | F |
| A-10 | CN | H | CN | H |
| A-11 | $CO_2CH_3$ | H | $CO_2CH_3$ | H |
| A-12 | Cl | $NHCOC_{11}H_{23}$ | Cl | $NHCOC_{11}H_{23}$ |
| A-13 | $C_{18}H_{37}$ | H | H | H |
| A-14 | F | H | H | H |
| A-15 | $OCH_3$ | H | H | H |
| A-16 | Cl | H | H | H |
| A-17 | Br | H | H | H |
| A-18 | $CH_2Ph$ | H | H | H |
| A-19 | $CH_2CO_2H$ | H | H | H |
| A-20 | $OCH_3$ | H | $OCH_3$ | H |

| No. | $R^1$ | $R^2$ | $R^3$ | $R^4$ |
|---|---|---|---|---|
| A-21 | $OC_2H_5$ | H | $SCH_3$ | H |
| A-22 | $CH_3$ | H | Br | H |
| A-23 | Cl | H | Cl | H |
| A-24 | $CH_3$ | H | $CH_3$ | H |
| A-25 | F | H | F | H |
| A-26 | $CO_2CH_3$ | H | H | H |
| A-27 | $COC_{11}H_{23}$ | H | H | H |
| A-28 | Br | H | $OCH_2CH_2OH$ | H |
| A-29 | $CH_3$ | H | H | H |
| A-30 | $OCH_3$ | H | $CH_3$ | H |
| A-31 | $OC_2H_5$ | H | $OC_2H_5$ | H |

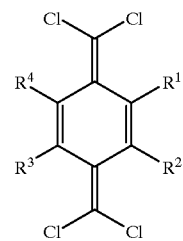

| | | | | |
|---|---|---|---|---|
| A-32 | Cl | Cl | Cl | Cl |
| A-33 | Cl | H | Cl | H |

A-34

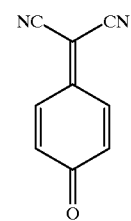

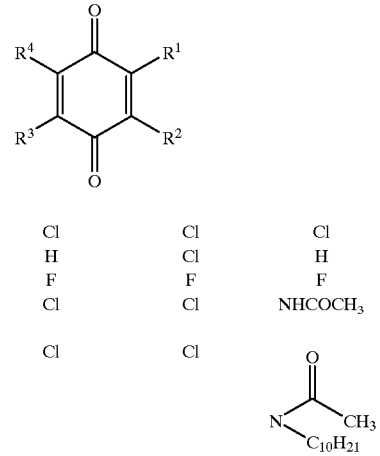

| | | | | |
|---|---|---|---|---|
| A-35 | Cl | Cl | Cl | Cl |
| A-36 | Cl | H | Cl | H |
| A-37 | F | F | F | F |
| A-38 | Cl | Cl | Cl | $NHCOCH_3$ |
| A-39 | Cl | Cl | Cl | |
| A-40 | Cl | $NHCOC_5H_{11}$ | Cl | $NHCOC_5H_{11}$ |
| A-41 | Cl | $NHCOC_{11}H_{23}$ | Cl | $NHCOC_{11}H_{23}$ |
| A-42 | Cl | $NHCONHC_2H_5$ | Cl | $NHCONHC_2H_5$ |
| A-43 | Cl | $NHSO_2CH_3$ | Cl | $NHSO_2CH_3$ |
| A-44 | Cl | $CO_2C_2H_5$ | Cl | $CO_2C_2H_5$ |
| A-45 | Cl | $CONHC_8H_{17}$ | Cl | $CONHC_8H_{17}$ |
| A-46 | Cl | H | $SC_2H_5$ | H |
| A-47 | H | H | H | H |
| A-48 | $CO_2C_2H_5$ | $CO_2C_2H_5$ | $CO_2C_2H_5$ | $CO_2C_2H_5$ |
| A-49 | $COC_8H_{17}$ | $COC_8H_{17}$ | $COC_8H_{17}$ | $COC_8H_{17}$ |
| A-50 | $CO_2C_2H_5$ | H | $CO_2C_2H_5$ | H |
| A-51 | $SC_{12}H_{25}$ | H | H | H |
| A-52 | Cl | Cl | CN | CN |

-continued

| No. | R¹ | R² | R³ | R⁴ |
|---|---|---|---|---|
| A-53 | | 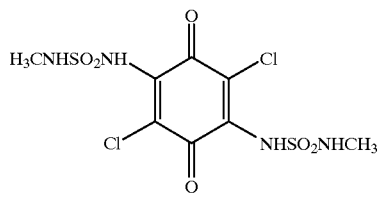 | | |
| A-54 | | 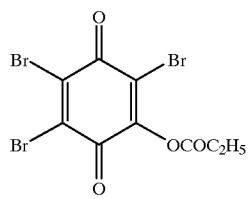 | | |
| A-55 | | 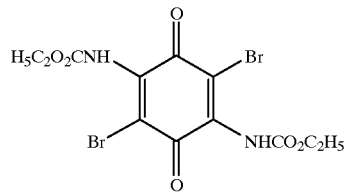 | | |
| A-56 | | 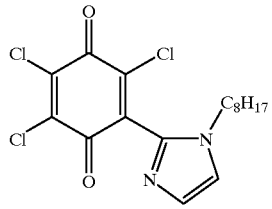 | | |
| A-57 | | 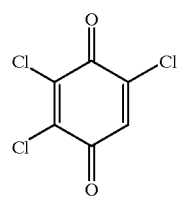 | | |
| A-58 | $SO_2C_2H_5$ | $SO_2C_2H_5$ | $SO_2C_2H_5$ | $SO_2C_2H_5$ |
| A-59 | $SO_2C_2H_5$ | $SO_2C_2H_5$ | $SO_2C_2H_5$ | $OC_2H_5$ |
| A-60 | $SO_2C_2H_5$ | $OC_2H_5$ | $SO_2C_2H_5$ | $OC_2H_5$ |
| A-61 | $SO_2C_2H_5$ | H | $SO_2C_2H_5$ | H |
| A-62 | $SOC_2H_5$ | $SOC_2H_5$ | $SOC_2H_5$ | $SOC_2H_5$ |
| A-63 | $SO_2Ph$ | $SO_2Ph$ | $SO_2Ph$ | Cl |
| A-64 | $SO_2Ph$ | $SO_2Ph$ | CN | CN |
| A-65 | $SO_2Ph$ | $SO_2Ph$ | $SO_2Ph$ | $SO_2Ph$ |
| A-66 | $SCF_3$ | $SCF_3$ | $SCF_3$ | $SCF_3$ |
| A-67 | $SOCF_3$ | $SOCF_3$ | $SOCF_3$ | $SOCF_3$ |
| A-68 | $SO_2CF_3$ | $SO_2CF_3$ | $SO_2CF_3$ | $SO_2CF_3$ |
| A-69 | $SO_2CF_3$ | H | $SO_2CF_3$ | H |
| A-70 | H | H | $SO_2CF_3$ | H |
| A-71 | Cl | $SO_2CF_3$ | $SO_2CF_3$ | Cl |

-continued

| No. | R¹ | R² | R³ | R⁴ |
|---|---|---|---|---|
| A-72 | | 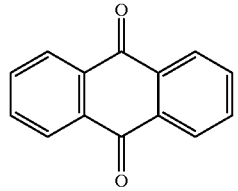 | | |
| A-73 | | 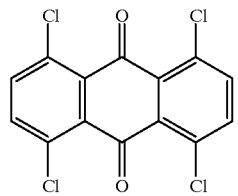 | | |
| A-74 | | 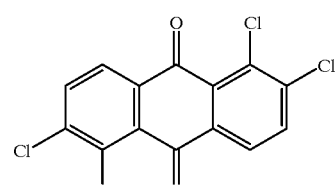 | | |
| A-75 | | 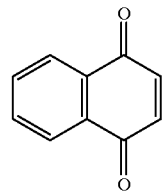 | | |
| A-76 | | 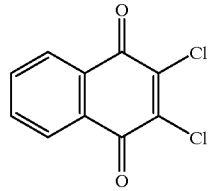 | | |
| A-77 | | 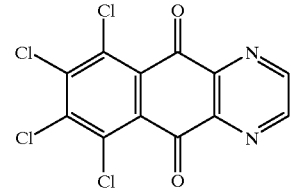 | | |
| A-78 | | 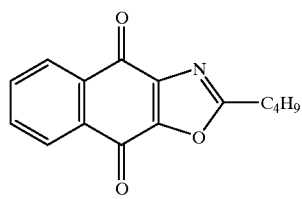 | | |

-continued
| No. | R¹ | R² | R³ | R⁴ |
|---|---|---|---|---|
| A-79 | 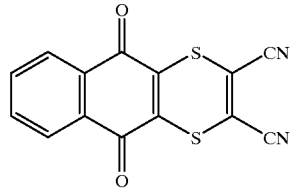 | | | |
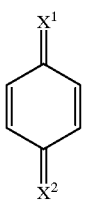
| No. | X¹ | X² |
|---|---|---|
| A-80 | S | S |
| A-81 | NC₈H₁₇ | NC₈H₁₇ |
| A-82 | S | O |
| A-83 | N+(C₅H₁₁)₂ | O |
| A-84 | CCl₂ | C(CN)₂ |
| A-85 | 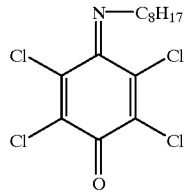 | |
| A-86 | 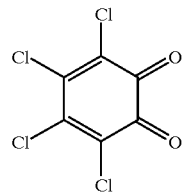 | |
| A-87 | 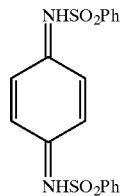 | |
| A-88 | 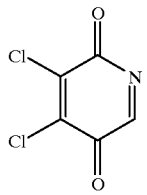 | |
-continued
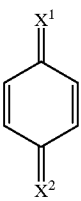
| No. | X¹ | X² |
|---|---|---|
| A-89 | 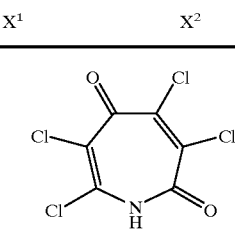 | |
| | 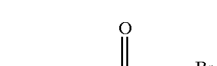 | |
| A-90 | 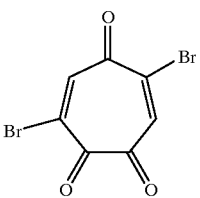 | |
| A-91 | 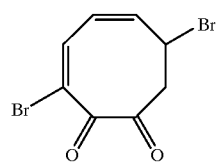 | |
| A-92 | 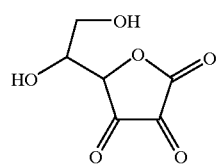 | |
| A-93 | 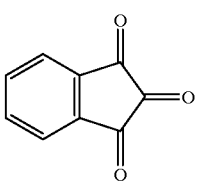 | |
| A-94 | 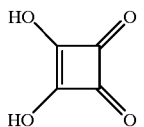 | |
| A-95 | 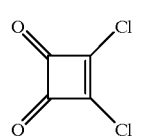 | |

-continued
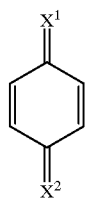
| No. | X¹ | X² |
|---|---|---|
| A-96 | | 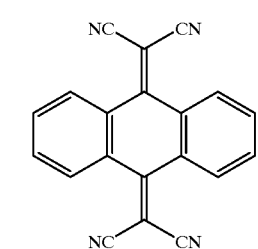 |
| A-97 | | 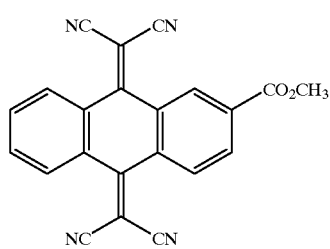 |
| A-98 | | 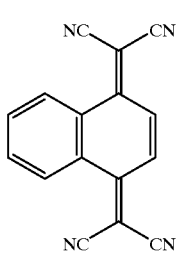 |
| A-99 | | 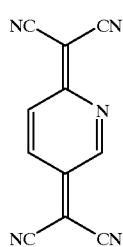 |
| A-100 | | 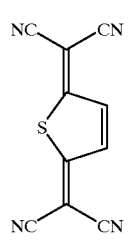 |
-continued
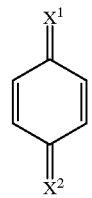
| No. | X¹ | X² |
|---|---|---|
| A-101 | | 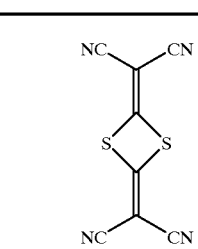 |
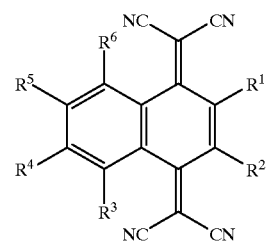
| No. | R¹ | R² | R³ | R⁴ | R⁵ | R⁶ |
|---|---|---|---|---|---|---|
| A-102 | CH₃ | H | H | H | H | H |
| A-103 | CH₃ | Cl | H | H | H | H |
| A-104 | CH₃ | CH₃ | H | H | H | H |
| A-105 | H | H | H | OCH₃ | H | H |
| A-106 | H | H | H | C₈H₁₇ | H | H |
| A-107 | H | H | H | SCH₃ | H | H |
| A-108 | 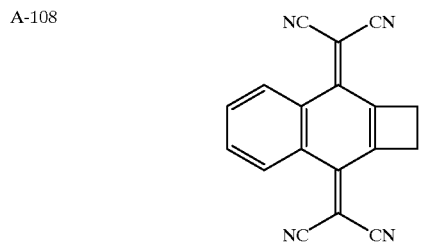 |
| A-109 | 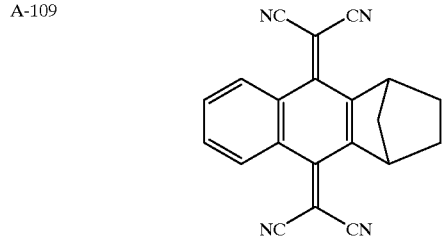 |

-continued

| No. | R¹ | R² | R³ | R⁴ | R⁵ | R⁶ |
|-----|----|----|----|----|----|-----|
| A-110 | | | | | | |
| A-111 | | | | | | |
| A-112 | | | | | | |
| A-113 | | | | | | |
| A-114 | | | | | | |

-continued

| No. | R¹ | R² | R³ | R⁴ | R⁵ | R⁶ |
|-----|----|----|----|----|----|-----|
| A-115 | | | | | | |
| A-116 | | | | | | |
| A-117 | | | | | | |
| A-118 | | | | | | |
| A-119 | | | | | | |

-continued
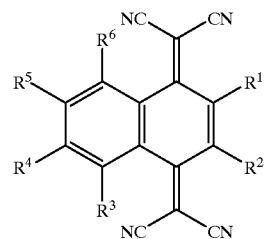
| No. | R¹ | R² | R³ | R⁴ | R⁵ | R⁶ |
|---|---|---|---|---|---|---|
A-120
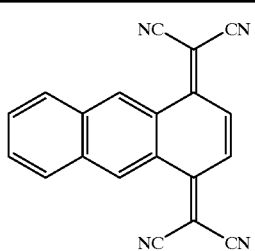
A-121
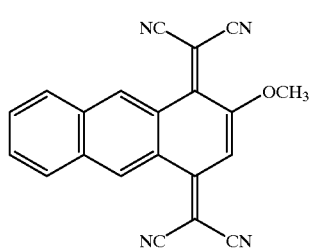
A-122
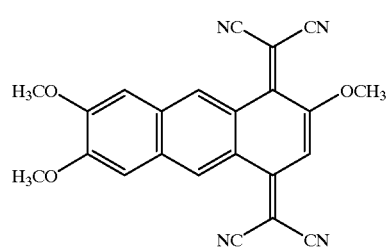
A-123
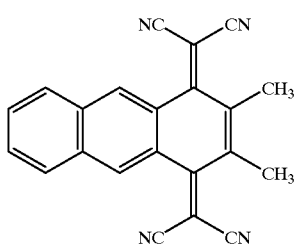
A-124
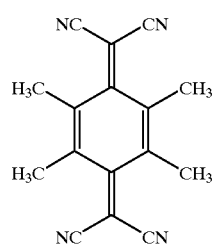
-continued
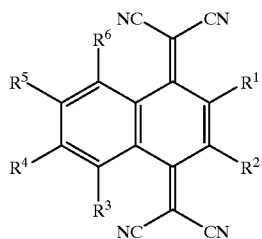
| No. | R¹ | R² | R³ | R⁴ | R⁵ | R⁶ |
|---|---|---|---|---|---|---|
A-125
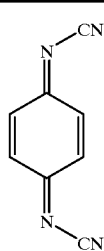
A-126
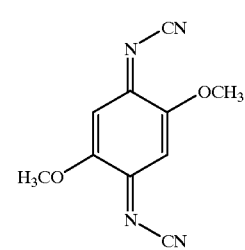
A-127
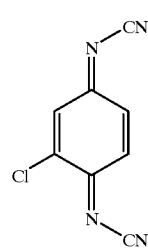
A-128
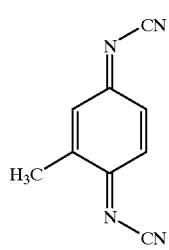
A-129
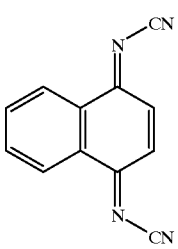

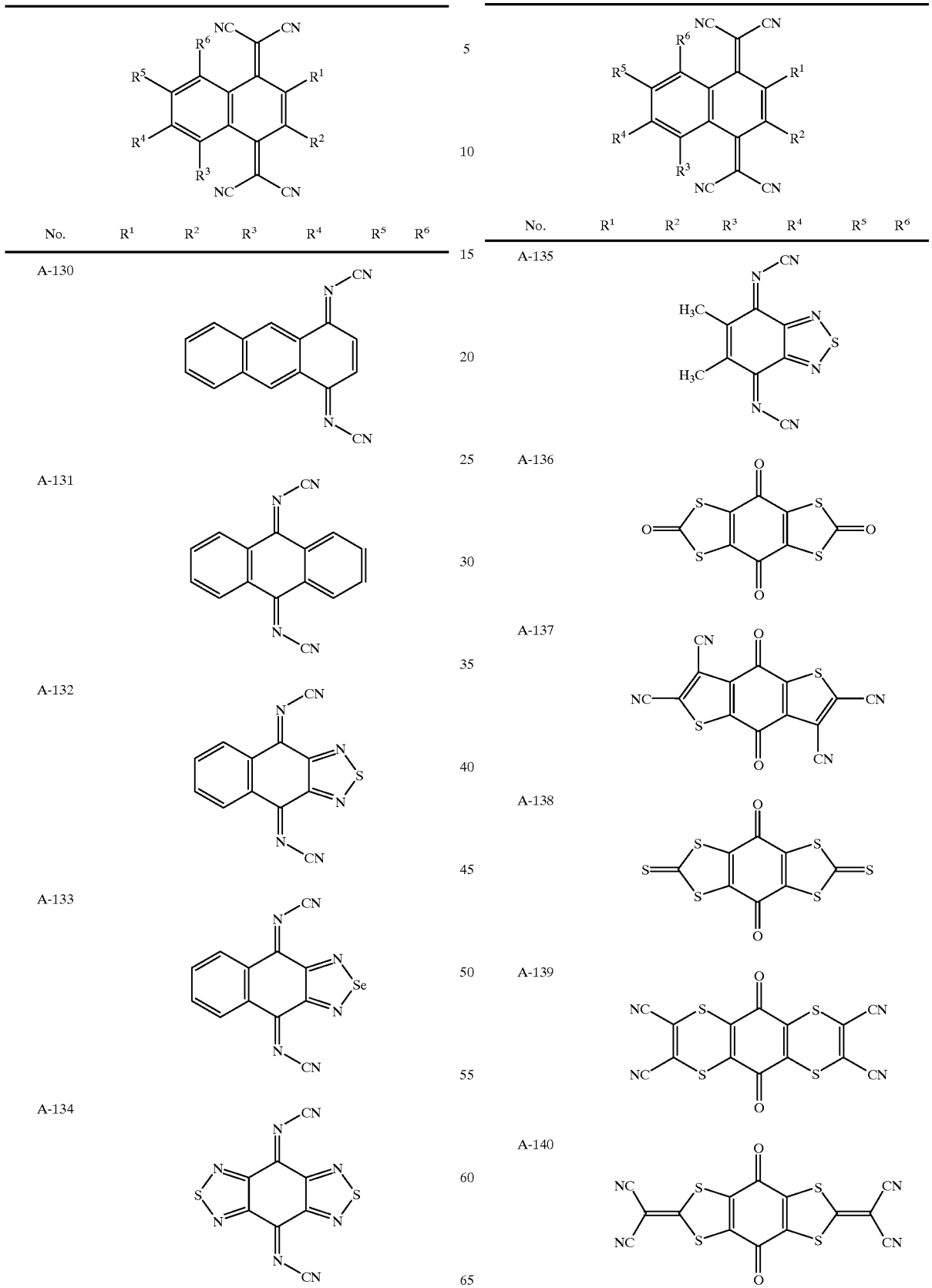

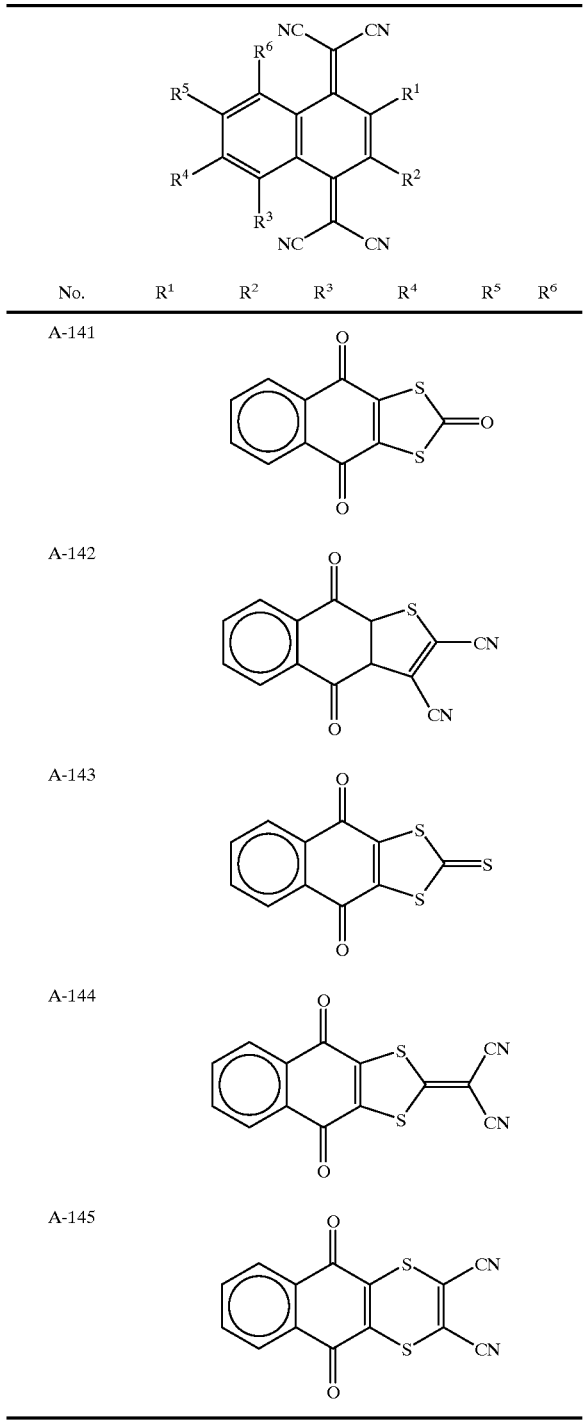

The compound of the formula (A) can be easily synthesized in a process according to the known process described, for instance, in J. Chem. Soc., Perkin Trans. 1, 611 (1992) and Synthesis, 546 (1971). Examples of the syntheses of the compounds of the formula (A) are given below.

Synthesis Examples

Syntheses of Compounds A-25a, A-25b and A-25

The compounds A-25a, A-25b and A-25 were synthesized in the following manners according to the below-illustrated scheme:

(1) Compound A-25a

A mixture of 2.72 g of 1,4-dibromo-2,5-difluorobenzene, 24.9 g of potassium iodide, 9.53 g of copper iodide, and 30 mL of HMPA (hexamethylphosphoric triamide) was heated to 150–160° C. in a nitrogen stream. After the heating was complete, aqueous diluted hydrochloric acid and ether were introduced into the reaction mixture. The copper salt was filtered off, and the organic layer was extracted. The organic portion was washed with aqueous sulfurous acid and dried over sodium sulfate. The dried portion was filtered, and the filtrate was concentrated under reduced pressure to give 2.93 g of the desired compound A-25a as a yellow crystalline product.

(2) Compound A-25b

To a mixture of 3.66 g of the above-obtained compound A-25a, 2.64 g of malononitrile, 1.44 g of sodium hydride and 0.21 g of bistriphenylphosphine palladium chloride was added 60 mL of THF (tetrahydrofuran). The resulting mixture was heated under reflux for 12 hours. After the reaction was complete, the reaction mixture was poured into 1N aqueous hydrochloric acid. The white precipitate was collected by filtration and dried, to give 2.68 g of the desired compound A-25b as a white crystalline product.

(3) Compound A-25

To 100 mL of water was added 3.36 g of the above-obtained compound A-25b. To the resulting suspension was gradually added an excessive amount of aqueous bromine solution. The mixture was then allowed to stand overnight, and the resulting red precipitate was collected by filtration. The collected precipitate was washed with chill water and dissolved in 60 mL of methylene chloride. The solution was dried over sodium sulfate, treated with active carbon. The solvent was distilled off, to leave 3.11 g of the desired compound A-25 as a yellow crystalline product.

Synthesis of Compounds A-41a and A-41

The compounds A-41a and A-41 were synthesized in the following manners according to the below-illustrated scheme:

(1) Compound A-41a

To 60 mL of acetonitrile was added 25.0 g of chloranil, and to the resulting suspension was continuously introduced gaseous ammonia. The produced brown precipitate was collected by filtration, and washed successively with water and 100 mL of acetonitrile. The washed precipitate was dried under reduced pressure to obtain 19.6 g of the desired A-41a.

(2) Compound A-41

To a mixture of 2.1 g of the above-obtained compound A-41a, 4.4 g of lauryl chloride, and 2.8 mL of triethylamine was added 100 mL of DMF (dimethylformamide). The resulting mixture was heated to 70° C. for 7 hours. The heated mixture was poured into 300 mL of chill water, and extraction with ethyl acetate was performed. The extract portion was dried over sodium sulfate, concentrated, and recrystallized from acetonitrile, to obtain 1.7 g of the desired compound A-41 as a yellow crystalline product.

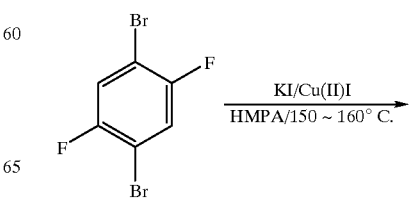

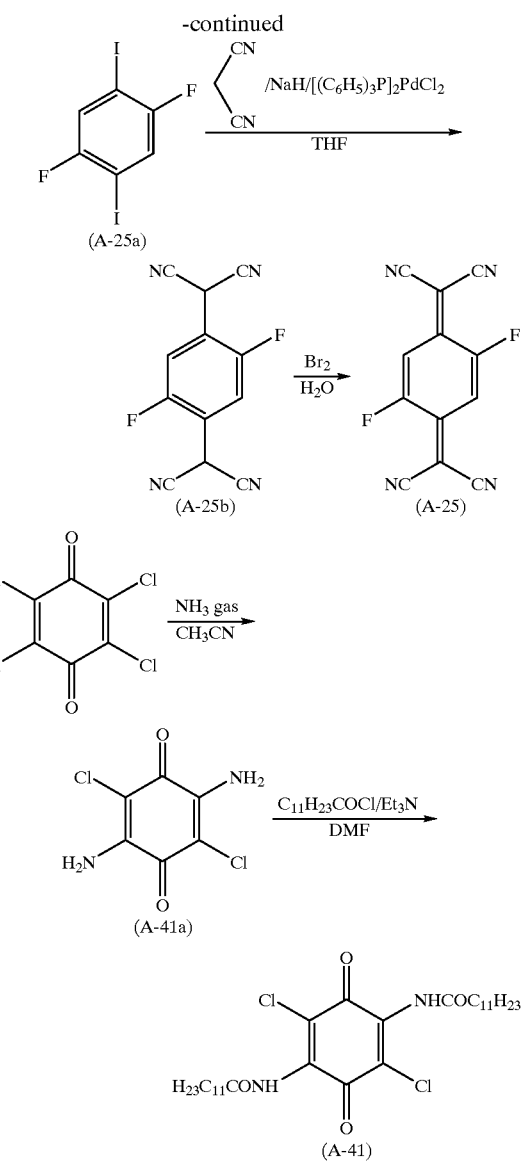
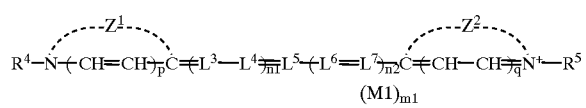

The organic oxidizing agent of the formula (A) can be employed singly or in combination with other known quenchers. Examples of the known quenchers employable in combination with the oxidizing agent of the formula (A) include metal complex compounds, diimmonium salts and aminium salts (which are described in Japanese Patent Provisional Publication H3-224793 as the formulas (III), (IV) and (V)) and nitroso compounds (which are described in Japanese Patent Provisional Publications H2-300287 and H2-300288). Preferred quenchers for combination are metal complex compound (e.g., PA-1006, available from Mitsui Toatsu Fine Co., Ltd.) and diimmonium salts (e.g., IRG-023 and IRG-022, available from Nippon Kayaku Co., Ltd.). The most preferred quencher for employment in combination with the oxidizing agent of the formula (A) is a diiimonium salt. One or more known quenchers can be employed in combination with the oxidizing agent of the formula (A).

The organic oxidizing agent of the formula (A) can be employed in an amount of 1 to 100 weight parts, preferably 1 to 50 weight parts, more preferably 1 to 25 weight parts, most preferably 1 to 10 weight parts, per 100 weight parts of the organic dye.

The known quencher can be employed, if desired, in an amount of 1 to 100 weight parts, preferably 1 to 50 weight parts, more preferably 1 to 25 weight parts, most preferably 1 to 10 weight parts, per 100 weight parts of the organic dye.

The organic dye employed in the invention is described below.

Examples of the employable organic dyes include cyanine dyes, merocyanine dyes, phthalocyanine dyes, oxonol dyes, pyrylium dyes, thiopyrilium dyes, triarylmethane dyes, polymethine dyes, squalium dyes, azulenium dyes, naphthoquinone dyes, anthraquinone indophenol dyes, indoaniline dyes, aminium-diimmon dyes, and pyran dyes.

Preferred is the symmetric or asymmetric cyanine dye of the following formula (B):

$$R^4-N+(CH=CH)_p C = \!\!\!\!\!\underset{Z^1}{\overbrace{\phantom{xxxxxx}}}\!\!\!\!\! = L^3-L^4 \!\!=\!\! L^5-(L^6=L^7)_{n2} C = \!\!\!\!\!\underset{Z^2}{\overbrace{\phantom{xxxxxx}}}\!\!\!\!\! = CH-CH)_q N^+-R^5 \quad (B)$$

$$(M1)_{m1}$$

in which each of $Z^1$ and $Z^2$ independently represents a atom groups required for forming a five- or six-membered heterocyclic ring; each of $R^4$ and $R^5$ independently represents an alkyl group; each of $L^3$, $L^4$, $L^5$, $L^6$ and $L^7$ independently represents a methine group; each of n1 and n2 independently represents 0 or 1; each of p and q independently represents 0 or 1; M1 represents a counter ion for neutralizing electric charge; and m1 is a number of more than 0, which is required for neutralizing electric charge of the formula.

Examples of the nuclei formed by $Z^1$ and $Z^2$ of the formula (B) include 3,3-dialkylindolenine nucleus, 3,3-dialkylbenzoindolenine nucleus, thiazol nucleus, benzothiazol nucleus, naphthothiazole nucleus, thiazoline nucleus, oxazole nucleus, benzoxazole nucleus, naphthoxazole nucleus, oxazoline nucleus, selenazole nucleus, benzoselenazole nucleus, naphthoselenazole nucleus, selenazoline nucleus, tellurazole nucleus, benzotellurazole nucleus, naphthotellurazole nucleus, tellurazoline nucleus, imidazole nucleus, benzimidazole nucleus, naphthimidazole nucleus, pyridine nucleus, quinoline nucleus, isoquinoline nucleus, imidazo[4,5-b]quinoxazline nucleus, oxadiazole nucleus, thiadiazole nucleus, tetrazole nucleus, and pyrimidine nucleus. The five- or six-membered nitrogen-containing heterocyclic group can have, if possible, one or substituents such as those described for $R^1$, $R^2$ and $R^3$ of the formula (A).

Examples of the substituent groups which can be attached to the heterocyclic group are described below in more detail.

The alkyl group preferably has 1 to 18 (more preferably 1 to 8) carbon atoms and can be of straight chain, branched chain, and cyclic, which can have one or more substituents such as above. Examples of the alkyl groups include methyl, ethyl, propyl, isopropyl, isobutyl, pentyl, 2-hydroxyethyl, 4-carboxybutyl, hexyl, octyl, decyl, benzyl and phenethyl.

The alkenyl group preferably has 2 to 18 (more preferably 2 to 8) carbon atoms and can be of straight chain, branched chain, and cyclic. Examples of the alkenyl groups include vinyl, allyl, 1-propenyl, 2-pentenyl, 1,3-butadienyl, and 2-octenyl.

The aralkyl group preferably has 7 to 10 carbon atoms and may be benzyl.

The aryl group preferably has 6 to 10 carbon atoms and may have one or more substituents such as above. Examples of the aryl group include phenyl, naphthyl, 4-carboxyphenyl, 3-carboxyphenyl, 3,5-dicarboxyphenyl, 4-methanesufonamidephenyl, and 4-butanesulfonamidephenyl The hetero ring group preferably is a 5- or 6-membered saturated or unsaturated hetero ring group comprising carbon, nitrogen, oxygen and/or sulfur atoms as the ring members. One or more hetero atoms can be included in the ring. Examples of the hetero ring groups include oxazole ring, benzoxazole ring, 5-carboxybenzoxazole ring, thiazole ring, imidazole ring, pyridine ring, sulforane ring, furan ring, thiophene ring, pyrazole ring, pyrrole ring, chroman ring, and coumarin ring.

Examples of the halogen atoms include a fluorine atom, a chlorine atom, and a bromine atom.

The alkoxy group preferably has 1 to 18 (more preferably 1 to 8) carbon, atoms and may have one or more substituents such as above. Examples of the alkoxy groups include methoxy, ethoxy, propoxy, and butoxy.

The aryloxy group preferably has 6 to 10 carbon atoms and may have one or more substituents such as above. Examples of the aryloxy groups include phenoxy and p-methoxyphenoxy.

The alkylthio group preferably has 1 to 18 (more preferably 1 to 8) carbon atoms. Examples of the alkylthio groups include methylthio and ethylthio.

The arylthio group preferably has 6 to 10 carbon atoms and may have one or more substituents such as above. An example of the arylthio group is phenylthio.

The acyloxy group preferably has 1 to 18 (more preferably 1 to 8) carbon atoms. Examples of the acyloxy groups include acetoxy, propanoyloxy, pentanoyloxy, and octanolyloxy.

The alkylamino group preferably has 1 to 18 (more preferably 1 to 8) carbon atoms. Examples of the alkylamino groups include methylamino, dimethylamino, diethylamino, dibutylamino, and octylamino.

The amide group preferably has 1 to 18 (more preferably 1 to 8) carbon atoms. Examples of the amide groups include acetamide, propanoylamino, pentanolylamino, octanolylamino, octanoylmethylamino, and benzamide.

The sulfonamide group preferably has 1 to 18 (more preferably 1 to 8) carbon atoms and may have one or more substituents such as above. Examples of the sulfonamide groups include methanesulfonamide, ethanesulfonamide, propylsulfonamide, butanesulfonamide, and benzenesulfonamide.

The alkoxycarbonylamino group preferably has 2 to 18 (more preferably 2 to 8) carbon atoms. Examples of the alkoxycarbonylamino groups include methoxycarbonylamino, and ethoxycarbonylamino.

The alkoxysulfonylamino group preferably has 1 to 18 (more preferably 1 to 8) carbon atoms. Examples of the alkoxysulfonylamino groups methoxysulfonylamino and ethoxysulfonylamino.

The sulfamoylamino group preferably has 0 to 18 (more preferably 0 to 8) carbon atoms. Examples of the sulfamoylamino groups include methylsulfamoylamino, dimethylsulfamoylamino, ethylsulfamoylamino, propylsulfamoylamino, and octylsulfamoylamino.

The ureido group preferably has 1 to 18 (more preferably 1 to 8) carbon atoms and may have one or more substituents such as above. Examples of the ureido groups include ureido, methylureido, N,N-dimethylureido, and octylureido.

The thioureido group preferably has 1 to 18 (more preferably 1 to 8) carbon atoms and may have one or more substituents such as above. Examples of the thioureido groups include thioureido, methylthioureido, N,N-dimethylthioureido, and octylthioureido.

The acyl group preferably has 1 to 18 (more preferably 1 to 8) carbon atoms. Examples of the acyl groups include acetyl, benzoyl, and propanoyl.

The alkoxycarbonyl group preferably has 2 to 18 (more preferably 2 to 8) carbon atoms. Examples of the alkoxycarbonyl groups include methoxycarbonyl, ethoxycarbonyl, and octyloxycarbonyl.

The carbamoyl group preferably has 1 to 18 (more preferably 1 to 8) carbon atoms. Examples of the carbamoyl groups include carbamoyl, N,N-dimethylcarbamoyl, and N-ethylcarbamoyl.

The sulfonyl group preferably has 1 to 18 (more preferably 1 to 8) carbon atoms. Examples of the sulfonyl groups include methanesulfonyl, ethanesulfonyl, and benzensulfonyl.

The sulfinyl group preferably has 1 to 18 (more preferably 1 to 8) carbon atoms. Examples of the sulfinyl groups include methanesulfinyl, ethanesulfinyl and octanesulfinyl.

The sulfamoyl group preferably has 0 to 18 (more preferably 0 to 8) carbon atoms and may have one or more substituents such as above. Examples of the sulfamoyl groups include sulfamoyl, dimethylsulfamoyl, ethylsulfamoyl, butylsulfamoyl, octylsulfamoyl, and phenylsulfamoyl.

Each of $Z^1$ and $Z^2$ preferably forms 3,3-dialkylindolenine nucleus or 3,3-dialkylbenzindolenine nucleus.

Each of $R^4$ and $R^5$ represents an alkyl group.

The alkyl group for $R^4$ and $R^5$ can be a straight-chain, branched-chain or cyclic alkyl group having 1 to 18 (more preferably 1 to 8) carbon atoms. The alkyl group can have one or more substituents such as those described for the substituents of the hetero-cyclic group. Preferred examples include unsubstituted alkyl groups and alkyl groups which have substituents such as aryl, halogen, hydroxyl, alkoxy, acyloxy, amide, sulfonamide, alkoxycarbonyl, carboxyl, or sulfo. The examples include methyl, ethyl, propyl, isopropyl, butyl, isobutyl, 2-ethylhexyl, octyl, benzyl, 2-phenylethyl, 2-hydroxyethyl, 3-hydroxypropyl, 2-carboxyethyl, 3-carboxypropyl, 4-carboxybutyl, carboxymethyl, 2-methoxyethyl, 2-(2-methoxyethoxy)ethyl, 2-sulfoethyl, 3-sulfopropyl, 3-sulfobutyl, 2-(3-sulfopropoxy)ethyl, 2-hydroxy-3-sulfopropyl, 3-sulfopropoxyethoxyethyl, 3-acetoxyethyl, carbomethoxymethyl, and 2-methanesulfonylaminoethyl.

Each of the methine group for $L^3$, $L^4$, $L^5$, $L^6$ and $L^7$ independently is an unsubstituted or substituted methine group. Examples of the substituent groups are those described for those of the nitrogen-containing heterocyclic group. If the methine group has substituent groups, these can be combined to form a 5- to 7-membered ring. Otherwise, a ring can be formed in combination with an auxochrome. Examples of the 5- to 7-membered ring include cyclopentene ring, 1-dimethylaminocyclopentene ring, 1-diphenylaminocyclopentene ring, cyclohexene ring, 1-chlorocyclohexene ring, isophorone ring, 1-morpholinocyclopentene ring, and cycloheptene ring.

M1 represents a counter ion for balancing the elctric charge, and can be a cation or an anion. Examples of the cations include alkali metal ions such as sodium ion, potassium ion and lithium ion, and organic compound ions such as tetraalkylammonium ion and pyridinium ion. The anions can be inorganic anions or organic anions. Examples of the anions include halogen anions (e.g., fluoride ion, chloride ion and iodide ion), sulfonate ions (e.g., methanesulfonate ion, trifluoromethanesulfonate ion, methylsulfate ion, p-toluenesulfonate ion, p-chlorobenzenesulfonate ion, 1,3-benzenedisulfonate ion, 1,5-naphthalenedisulfonate ion, and 2,6-naphthalenedisulfonate ion), sulfuric acid ions, thiocyanate ions, perchlorate ions, tetrafluoroborate ions, picrate ions, acetate ions, metal complex compound ions of the following formulas:

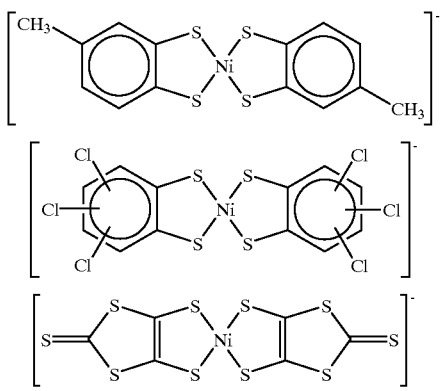

and phosphorus acid ions such as hexafluorophosphonate ion, and the phosphonate ion of the following formula:

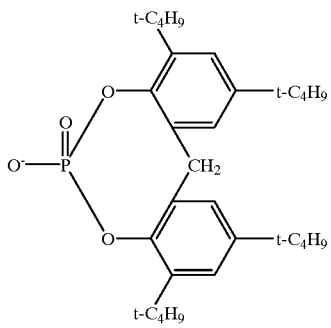

m1 represents the number (0 or more, preferably 0 to 4) of the ions required for balancing the electric charge. If the electric balance is made within the molecule, m1 is 0. Each of p and q independently represents 0 or 1. Both of p and q preferably are 0.

The compound of the formula (B) can form a bis-type structure by combining two compounds at carbon atoms in any optional positions.

The organic dye more preferably has the following formula (B-1):

(B-I)

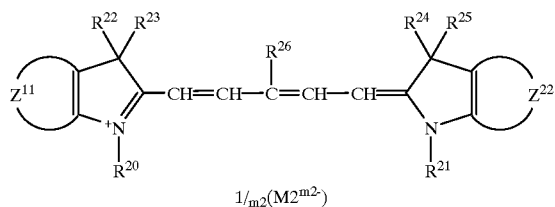

in which each of $R^{20}$, $R^{21}$, $R^{22}$, $R^{23}$, $R^{24}$, and $R^{25}$ independently represents an alkyl group having 1 to 8 carbon atoms; $R^{26}$ represents a hydrogen atom, an alkyl group having 1 to 8 carbon atoms, an aralkyl group having 7 to 10 carbon atoms, an aryl group having 6 to 10 carbon atoms, a heterocyclic group, a halogen atom, or a carbamoyl group having 1 to 8 carbon atoms. These groups can have one or more substituent groups. $M2^{m2-}$ represents an anion, and m2 is 1 or 2; and each of $Z^{11}$ and $Z^{12}$ independently represents a group of atoms which can form a benzene or naphthalene ring which may have one or more substituent groups.

In the cyanine dye compound of the formula (B-I), the following combinations are preferred. Each of $R^{20}$ and $R^{21}$ independently an unsubstituted alkyl group having 1 to 6 carbon atom or an alkyl group having 1 to 6 carbon atoms which has substituent groups such as a fluorine atom or an alkoxy group. $R^{26}$ is a hydrogen atom, a halogen atom, or an alkyl, phenyl, pyridyl, pyrimidyl or benzoxazole group which may have one or more substituent groups. Each of $Z^{11}$ and $Z^{12}$ independently represents a group of atoms which is required for forming an unsubstituted benzene or naphthalene ring, or a benzene ring having one or two substituent groups such as methyl, chlorine, fluorine, methoxy, or ethoxy. M2 preferably is perchlorate ion, 1,5-naphthalenedisulfonate ion, hexafluorophosphate ion, or a metal complex ion of the following formula:

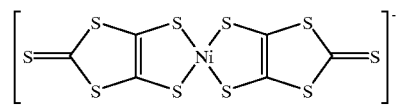

In the formula (B-I), the following combinations are preferred. Each of $R^{20}$ and $R^{21}$ independently is an unsubstituted alkyl group (e.g., methyl, ethyl, propyl, isopropyl, or butyl). Each of $R^{22}$, $R^{23}$, $R^{24}$ and $R^{25}$ independently is methyl or ethyl. $R^{26}$ is hydrogen, methyl, ethyl, chlorine, or bromine.

More preferably, the organic dye is a cyanine dye having the formula (B-II):

(B-II)

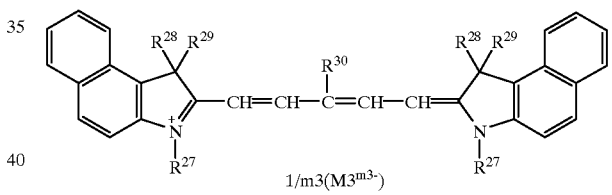

in which $R^{27}$ has the same meaning as $R^{20}$ and $R^{21}$ of the formula (B-I); $R^{28}$ and $R^{29}$ have the same meanings as $R^{22}$, $R^{23}$, $R^{24}$ and $R^{25}$ of the formula (B-I); $R^{30}$ has the same meaning as $R^{26}$ of the formula (B-I); M3 has the same meaning as M2 of the formula (B-I); and m3 has the same meaning as m2 of the formula (B-I).

Most preferably, the organic dye is a cyanine dye having the following formula (B-III):

(B-III)

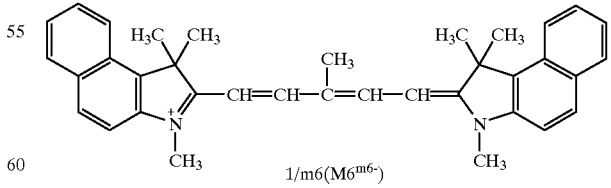

in which $M6^{m6-}$ represents an anion; and m6 is 1 or 2. $M6^{m6-}$ has the same meaning as $M2^{m2-}$ of the formula (B-I), and m6 has the same meaning as m2 of the formula (B-I).

The preferred examples of the organic dyes having the formula (B) are listed below.

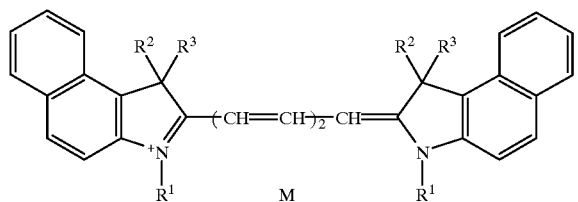

| No. | R¹ | R² | R³ | M |
|---|---|---|---|---|
| B-1 | $CH_3$ | $CH_3$ | $CH_3$ | $ClO_4-$ |
| B-2 | $CH_3$ | $CH_3$ | $C_2H_5$ | $ClO_4-$ |
| B-3 | $CH_3$ | $CH_3$ | $C_2H_5$ | $PF_6-$ |
| B-4 | $C_2H_5$ | $CH_3$ | $CH_3$ | $CH_3$-C$_6$H$_4$-$SO_3^-$ |
| B-5 | $n$-$C_3H_7$ | $CH_3$ | $CH_3$ | $CF_3SO_3-$ |
| B-6 | $n$-$C_4H_9$ | $CH_3$ | $CH_3$ | $ClO_4-$ |
| B-7 | $n$-$C_4H_9$ | $CH_3$ | $CH_3$ | Ni(dithiolene-(OCH$_3$)$_2$)$_2$ complex |
| B-8 | $CH_2CH(CH_3)_2$ | $CH_3$ | $CH_3$ | $ClO_4-$ |
| B-9 | $CH_2CH_2CF_2H$ | $CH_3$ | $CH_3$ | $ClO_4-$ |
| B-10 | $CH_2CH(C_2H_5)$-$n$-$C_4H_9$ | $CH_3$ | $CH_3$ | $PF_6-$ |
| B-11 | $CH_3$ | $CH_3$ | $CH_3$ | $CH_3$-C$_6$H$_4$-$SO_3^-$ |
| B-12 | $CH_2CH_2OC_2H_5$ | $CH_3$ | $CH_3$ | $ClO_4-$ |
| B-13 | $n$-$C_4H_9$ | $CH_3$ | $C_2H_5$ | $ClO_4-$ |
| B-14 | $n$-$C_4H_9$ | $CH_3$ | $C_2H_5$ | $PF_6-$ |
| B-15 | $C_2H_5$ | $CH_3$ | $C_2H_5$ | $ClO_4-$ |

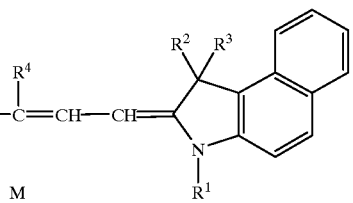

| No. | R¹ | R² | R³ | R⁴ | M |
|---|---|---|---|---|---|
| B-16 | $CH_3$ | $CH_3$ | $CH_3$ | $CH_3$ | $ClO_4-$ |
| B-17 | $C_2H_5$ | $CH_3$ | $CH_3$ | $CH_3$ | $ClO_4-$ |
| B-18 | $n$-$C_3H_7$ | $CH_3$ | $CH_3$ | $CH_3$ | $ClO_4-$ |
| B-19 | $n$-$C_4H_9$ | $CH_3$ | $CH_3$ | $CH_3$ | $ClO_4-$ |
| B-20 | $CH_3$ | $CH_3$ | $CH_3$ | $CH_2$-C$_6$H$_5$ | $ClO_4-$ |

-continued

| No. | R¹ | R² | R³ | (substituent/structure) | (counter) |
|---|---|---|---|---|---|
| B-21 | $CH_3$ | $CH_3$ | $CH_3$ | (4-methylphenyl) | $ClO_4^-$ |
| B-22 | $CH_3$ | $CH_3$ | $CH_3$ | (4-methylpyridyl) | $ClO_4^-$ |
| B-23 | $CH_3$ | $CH_3$ | $CH_3$ | (2-methylbenzoxazolyl) | $ClO_4^-$ |
| B-24 | $CH_3$ | $CH_3$ | $CH_3$ | Br | $ClO_4^-$ |
| B-25 | $CH_3$ | $CH_3$ | $CH_3$ | Cl | $ClO_4^-$ |
| B-26 | $CH_2CO_2C_2H_5$ | $CH_3$ | $CH_3$ | H | $ClO_4^-$ |
| B-27 | $CH_2CO_2$-(1-naphthyl) | $CH_3$ | $CH_3$ | H | $ClO_4^-$ |
| B-27 | $CH_2CH_2$-(1-naphthyl) | $CH_3$ | $CH_3$ | H | $ClO_4^-$ |

B-28:

Structure with two 1,1-dimethyl-benz[e]indolium groups connected by $-(CH=CH)_2-CH=$ chain; N-substituents: $N-C_3H_7$ and $n-C_4H_9$; counter ion $ClO_4^-$.

| No. | R¹ | R² | R³ | R⁴ | M |
|---|---|---|---|---|---|
| B-29 | $CH_3$ | $CH_3$ | $CH_3$ | H | 4-methylbenzenesulfonate ($CH_3$-C$_6$H$_4$-$SO_3^-$) |
| B-30 | $CH_3$ | $CH_3$ | $C_2H_5$ | H | $ClO_4^-$ |
| B-31 | $C_2H_5$ | $CH_3$ | $CH_3$ | $CH_3$ | $ClO_4^-$ |

-continued

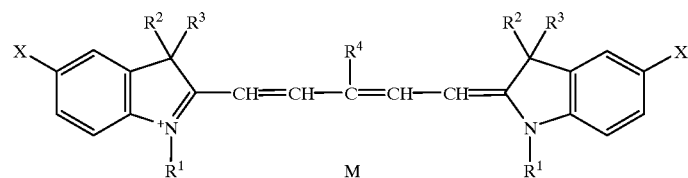

| No. | R¹ | R² | R³ | R⁴ | X | M |
|---|---|---|---|---|---|---|
| B-32 | $C_2H_5$ | $CH_3$ | $CH_3$ | $CH_2$-phenyl | H | $ClO_4-$ |
| B-33 | $n-C_3H_7$ | $CH_3$ | $CH_3$ | H | H | $ClO_4-$ |
| B-34 | $CH_2CH(CH_3)_2$ | $CH_3$ | $CH_3$ | H | H | $PF_6-$ |
| B-35 | $n-C_4H_9$ | $CH_3$ | $CH_3$ | H | $CH_3$ | $I-$ |
| B-36 | $CH_2CH_2OC_2H_5$ | $CH_3$ | $CH_3$ | H | Cl | $ClO_4-$ |
| B-37 | $n-C_3H_7$ | $CH_3$ | $CH_3$ | $CH_3$ | $OCH_3$ | $ClO_4-$ |
| B-38 | $CH_2CH(CH_3)_2$ | $CH_3$ | $CH_3$ | H | $SO_2NH_2$ | $ClO_4-$ |
| B-39 | $n-C_3H_7$ | $CH_3$ | $CH_3$ | H | H | Ni(dithiolene) complex |
| B-40 | $n-C_4H_9$ | $CH_3$ | $CH_3$ | phenyl | H | $ClO_4-$ |
| B-41 | $n-C_3H_7$ | $CH_3$ | $CH_3$ | $C_2H_5$ | Cl | $PF_6-$ |
| B-42 | $CH_2CH(CH_3)_2$ | $CH_3$ | $CH_3$ | H | $CO_2C_2H_5$ | $PF_6-$ |
| B-43 | $n-C_3H_7$ | $CH_3$ | $C_2H_5$ | H | H | $ClO_4-$ |

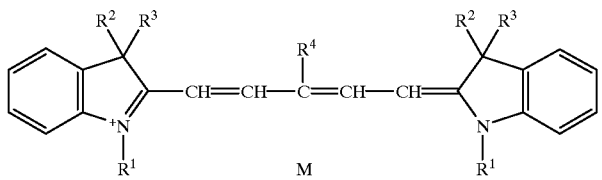

| No. | R¹ | R² | R³ | R⁴ | M |
|---|---|---|---|---|---|
| B-44 | $n-C_3H_7$ | $CH_3$ | $C_2H_5$ | H | $PF_6-$ |
| B-45 | $C_2H_5$ | $CH_3$ | $C_2H_5$ | H | $ClO_4-$ |
| B-46 | $n-C_4H_9$ | $CH_3$ | $C_2H_5$ | H | $ClO_4-$ |
| B-47 | $CH_3$ | $CH_3$ | $CH_3$ | Br | $ClO_4-$ |
| B-48 | $CH_3$ | $CH_3$ | $CH_3$ | Cl | $ClO_4-$ |
| B-49 | $CH_3$ | $CH_3$ | $CH_3$ | methylpyrimidinyl | $I-$ |

B-50

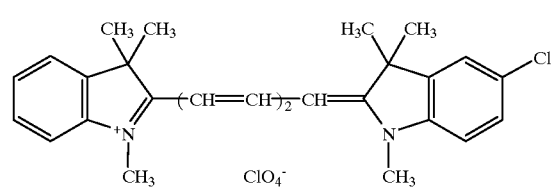

-continued
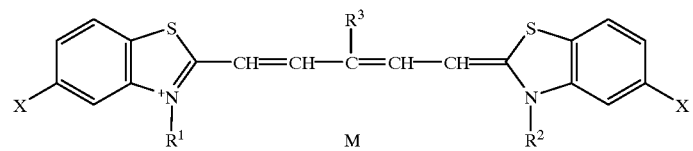
| No. | R¹ | R² | R³ | X | M |
|---|---|---|---|---|---|
| B-51 | $C_2H_5$ | $C_2H_5$ | $CH_3$ | H | I— |
| B-52 | $CH_3$ | $CH_3$ | H | NHCO-phenyl | I— |
| B-53 | $CH_3$ | $CH_3$ | H | $CH_3$ | I— |
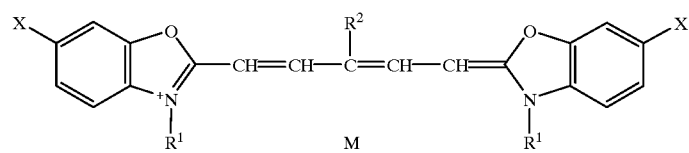
| No. | R¹ | R² | X | M |
|---|---|---|---|---|
| B-54 | $CH_3$ | $CH_3$ | H | I— |
| B-55 | $C_2H_5$ | $C_2H_5$ | Br | I— |
| B-56 | $(CH_2)_2$—$CO_2H$ | Br | $COCH_2CH_2OH$ | Na+ |
B-57 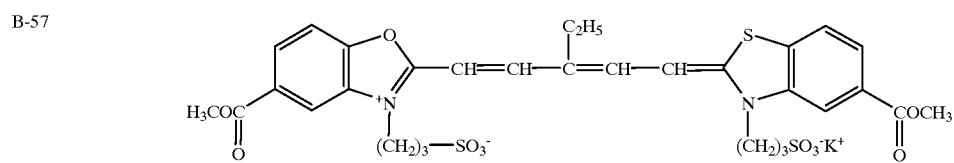
B-58 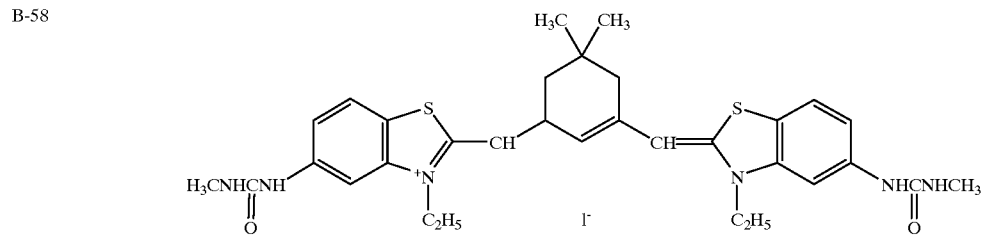
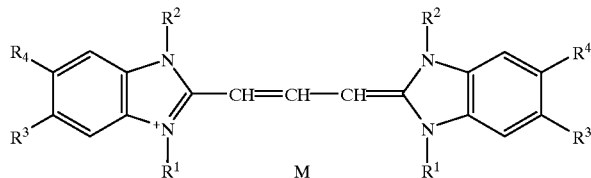
| No. | R¹ | R² | R³ | R⁴ | M |
|---|---|---|---|---|---|
| B-59 | $(CH_2)_4SO_3$— | $C_2H_5$ | $CF_3$ | Cl | K+ |
| B-60 | $(CH_2)_4SO_3$— | $C_2H_5$ | CN | Cl | K+ |

-continued
B-61 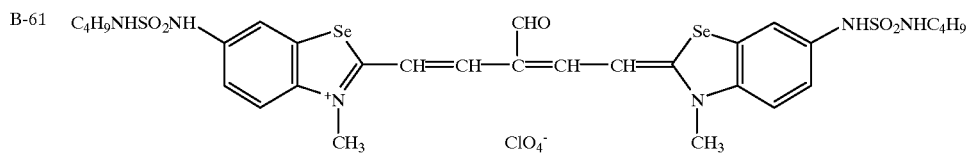
B-62 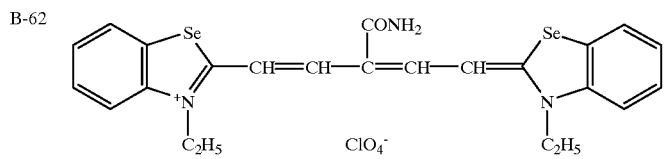
B-63 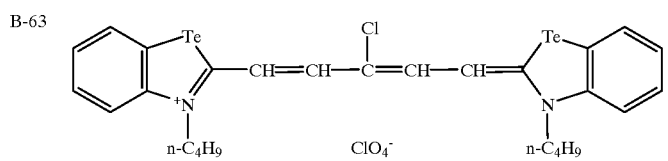
B-64 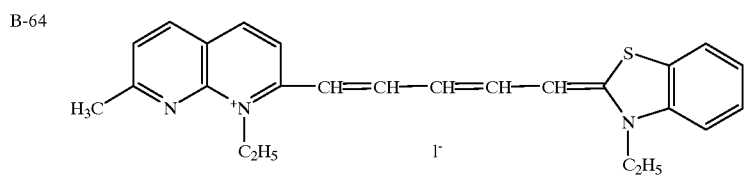
B-65 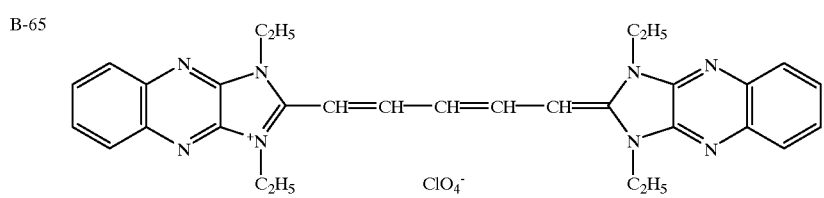
B-66 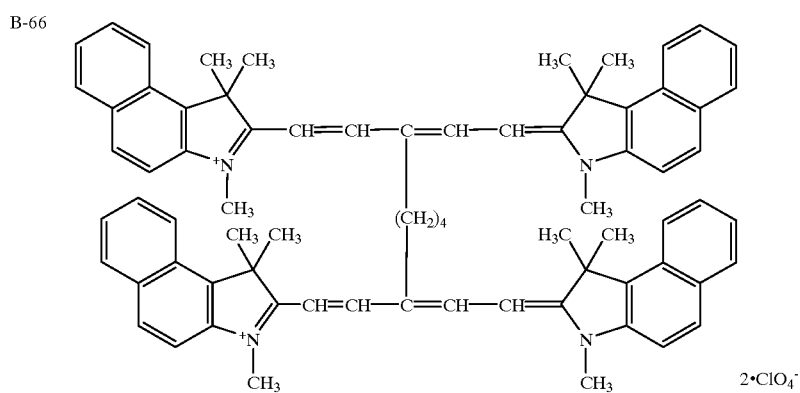
B-67 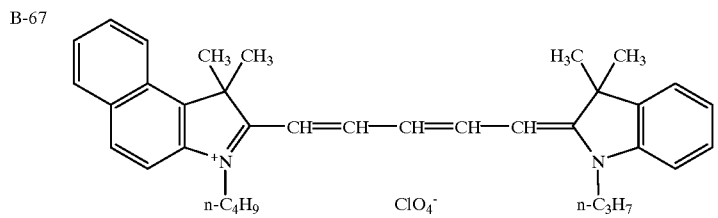

-continued

B-68
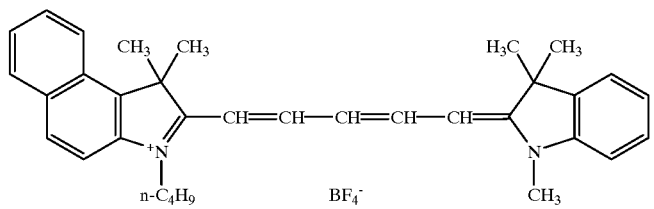

B-69
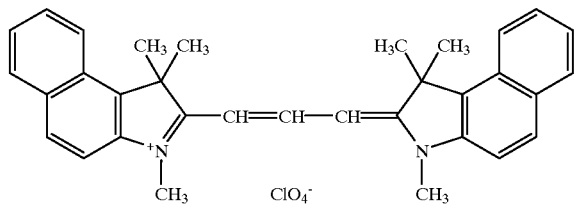

B-70
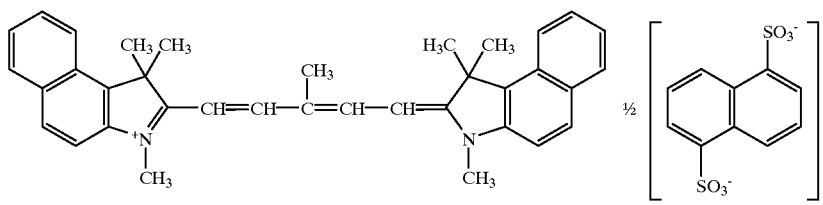

The compound of the formula (B) can be prepared by the processes described in, for instance, "Heterocyclic Compounds-Cyanine Dyes and Related Compounds" (by F. M. Hamer, John Wiley & Sons, New York, London, 1964), "Heterocyclic Compounds-Special topics in heterocyclic chemistry" (by D. M. Sturmer, Chapter 18, Section 14, pp. 482–515, John Wiley & Sons, New York, London, 1977); and "Rodd's Chemistry of Carbon Compounds" (2nd Ed., Vol. IV, Part B, Chapter 15, pp. 369–422, Elsevir Science Publishing Company Inc., New York, 1977).

The organic dye of the formula (B) can be employed singly or in combination. The organic dye of the formula (B) can be employed in combination with other dyes which are known as dyes for forming a recording layer of a light information recording medium. Examples of such known dyes include cyanine dyes other than the dyes of the formula (B), phthalocyanine dyes, pyrylium dyes, thiopyrilium dyes, azulenium dyes, squalilium dyes, metal complex dyes of metal such as Ni or Cr, naphthoquinone dyes, anthraquinone dyes, indophenol dyes, indoaniline dyes, triphenylmethane dyes, triallylmethane dyes, aminium dyes, diimmonium dyes, and nitroso dyes.

The information recording medium of the invention can be prepared by the following method.

The substrate which is transparent can be made of any of materials known as the materials for the producing the substrate of the light information recording medium. Examples of the materials include glass, polycarbonate, acrylic resins such as polymethyl methacrylate, vinyl chloride resins such as polyvinyl chloride and vinyl chloride copolymer, epoxy resins, amorphous polyolefins, and polyesters. These materials can be employed in combination, if desired. These materials are molded to give a film or a rigid plate. Most preferred from the viewpoints of anti-humidity and dimensional stability is polycarbonate.

The substrate may have on its surface on the recording layer side an undercoating layer for enhancing surface smoothness and adhesion, and keeping the dye recording layer from deterioration. Examples of the material for the undercoating layer include polymers such as polymethyl methacrylate, acrylate-methacrylate copolymer, styrene-maleic anhydride copolymer, polyvinyl alcohol, N-methylolacrylamide, styrene-vinyltoluene copolymer, chlorosulfonated polyethylene, nitrocellulose, polyvinyl chloride, chlorinated polyolefin, polyester, polyimide, vinyl acetate-vinyl chloride copolymer, ethylene-vinyl acetate copolymer, polyethylene, polypropylene, and polycarbonate, and surface treating agents such as a silane-coupling agent.

The undercoating layer can be formed by a coating solution in which one or more of the above-mentioned materials are dissolved or dispersed on the surface of the substrate by the known coating methods such as spin-coat, dip-coat, and extrusion-coat. The undercoating layer generally has a thickness of 0.005 to 20 μm, preferably 0.01 to 10 μm.

On the surface of the substrate or on the undercoating layer, pregroove for tracking or giving address signals is preferably formed. The pregroove is preferably formed directly on the surface of the substrate when the substrate is molded from polymer material by injection or extrusion.

Alternatively, the pregroove can be provided on the surface of the substrate by placing a pregroove layer. The pregroove layer can be produced from a mixture of a monomer such as monoester, diester, triester, or tetraester of acrylic acid, or its oligomer, and a light-polymerization reaction initiator. The pregroove layer can be produced by the steps of coating a mixture of the polymerization initiator and the monomer such as the above-mentioned acrylic ester on a precisely produced stamper, placing on the coated layer a substrate, and irradiating the coated layer with ultra-violet rays through the stamper or substrate, so as to cure the coated layer as well as to combine the cured layer and the substrate. The substrate to which the cured coated layer is attached is separated from the stamper, to give the desired substrate equipped with the pregroove layer. The thickness of the pregroove layer generally is in the range of 0.05 to 100 μm, preferably in the range of 0.1 to 50 μm.

The pregroove formed on the substrate preferably has a depth in the range of 300 to 2,000 angstroms and a half-width of 0.2 to 0.9 μm. The depth of 1,500 to 2,000 angstroms of the pregroove is preferably adopted because such pregroove can enhance the sensitivity without decreasing the light-reflection on the substrate. The optical disc having a recording dye layer coated on the deep pregroove and a light-reflection layer shows a high sensitivity, and hence is employable even in a recording system using a laser light of low laser power. This means that a semiconductor laser of a low coat can be employed or the life of semiconductor laser can be prolonged.

On the substrate, optionally via the undercoating, the recording dye layer or dye recording layer is placed. The recording dye layer comprises the combination of the organic dye and the organic oxidizing agent described hereinbefore. The recording layer can further comprise a binder polymer.

The recording layer can be formed on the substrate by coating a solution of a mixture of the organic dye and oxidizing agent in an organic solvent and drying the coated layer. Examples of the organic solvents include esters such as butyl acetate and cellosolve acetate; ketones such as methyl ethyl ketone, cyclohexanone and methyl isobutyl ketone; chlorinated hydrocarbons such as dichloromethane, 1,2-dichloroethane and chloroform; amides such as dimethylformamide; hydrocarbons such as cyclohexanone; ethers such as tetrahydrofuran, diethyl ether and dioxane; alcohols such as ethanol, n-propanol, isopropanol, n-butanol, and diacetone alcohol; fluorine-containing solvents such as 2,2,2,2-tetrafluoropropanol; and glycol ethers such as ethyleneglycol monomethyl ether, ethyleneglycol monoethyl ether, and propyleneglycol monomethyl ether. These solvents can be employed in combination, in consideration of the solubility of the dye in the solvent.

The coating solution can further contain auxiliary additives such as an oxidation inhibitor, a UV absorber, a plasticizer, and a lubricant.

Examples of the binders include natural-origin polymers such as gelatin, cellulose derivatives, dextran, rosin, and rubber; hydrocarbon polymer resins such as polyethylene, polypropylene, polystyrene and polyisobutyrene; vinyl polymers such as polyvinyl chloride, polyvinylidene chloride, and vinyl chloride-vinyl acetate copolymer; acrylate polymers such as polymethyl acrylate and polymethyl methacrylate; polyvinyl alcohol, chlorinated polyethylene; epoxy resins; butyral resins, rubber derivatives, and thermosetting resins such as prepolymers of phenol-formaldehyde. The binder is optionally employed in the amount of 0.01 to 50 weight parts, preferably 0.1 to 5 weight parts, per 1 weight part of the dye.

The coating solution generally has a concentration of 0.01 to 10 weight % (solid content), preferably 0.1 to 5 weight %.

The coating can be performed by the known methods such as spray coat, spin coat, dip coat, roller coat, blade coat, doctor roller coat and screen print.

The recording layer can be a single layer or can comprise plural layers. The thickness of the recording layer generally is in the range of 20 to 500 nm, preferably 50 to 300 nm. The recording layer can be provided on both of the surfaces of the substrate.

On the recording layer, the light-reflecting layer is placed so as to enhance the light-reflection in the course of reproduction of information.

The light-reflecting material to be used for the formation of the light-reflecting layer should show a high reflection to the laser light. Examples of the light-reflecting materials include metals and submetals such as Mg, Se, Y, Ti, Zr, Hf, V, Nb, Ta, Cr, Mo, W, Mn, Re, Fe, Co, Ni, Ru, Rh, Pd, Ir, Pt, Cu, Ag, Au, Zn, Cd, Al, Ga, In, Si, Ge, Te, Pb, Po, Sn, and Bi. Stainless steel film is also employable. Preferred light-reflecting material is Cr, Ni, Pt, Cu, Ag, Au and Al. These materials can be employed singly or in the form of alloy. Most preferred are Au and Ag.

The light-reflecting layer can be formed on the recording layer by vacuum deposition, spattering or ion-plating. The thickness of the light-reflecting layer generally is 10 to 200 nm, preferably 50 to 200 nm.

On the light-reflecting layer can be placed a protective layer. The protective layer can be placed on the substrate on the side not having the recording layer.

The protective layer can be formed of inorganic materials such as SiO, $SiO_2$, $MgF_2$, $SnO_2$, $Si_3N_4$; or organic materials such as thermoplastic resins, thermo-setting resins, and UV curable resins.

The protective layer can be formed on the light-reflecting layer or the substrate by laminating a film of plastic material using an adhesive. The inorganic material can be placed on the light-reflecting layer or the substrate by vacuum deposition or spattering. The organic polymer material can be coated in the form of a solution containing the polymer material and dried to give the protective layer. The UV curable resin is dissolved in a solvent and coated on the light-reflecting layer or the substrate, and cured by applying ultra-violet rays to the coated layer. The coating layer can contain various additives such as an anti-static agent, an oxidation inhibitor, and a ultra-violet absorber. The protective layer generally has a thickness of 0.1 to 100 μm.

The information recording medium of the invention can comprise one substrate having one or two recording layers or two substrates each of which has one recording layer and combined to give a known air sandwich structure.

The information recording medium of the invention shows a high light-reflection and an improved light-resistance as well as good recording and reproducing characteristics. Particularly, the information recording medium of the invention shows an extremely high light-reflection of as high as 80%, and hence the reproduction of the recorded information can be accomplished by means of a commercially available CD player.

The information recording can be made in the following manner using the recording medium of the invention.

The information recording medium is rotated at a predetermined constant line rate (1.2 to 14 m/sec., in the case of CD format) or a predetermined constant angle rate. On the rotated medium, a recording light source such as a semiconductor laser beam is applied through the transparent substrate. By the application of the laser beam, a pit is formed in the recording layer. The pit is assumed to be produced by local vacancy of the recording layer, deformation of the recording layer and/or the substrate, change of the physical or chemical characteristics of the recording layer. The light source preferably is a semiconductor layer having an oscillation frequency in the range of 500 to 850 nm. The preferred beam wavelength is in the range of 500 to 800 nm. In the case of the CR-R type recording medium, the laser beam preferably has a wavelength of 770 to 790 nm, while in the case of DVD-R type recording medium, the laser beam preferably has a wavelength of 630 to 680 nm.

The reproduction of the recorded information can be accomplished by applying a semiconductor laser beam on the medium rotated at the same rate as that employed in the recording procedure. The light-reflection is then detected on the substrate side.

The present invention is further described by the following non-restrictive working examples.

EXAMPLE 1

In 2,2,3,3-tetrafluoropropanol were dissolved the aforementioned cyanine dye of the formula [B-16] and the organic oxidizing agent (serving as quencher for inhibiting discoloration) set forth in Table 1, or the nitroso compound (a) of the following formula to give a coating solution:

Nitroso compound (a)

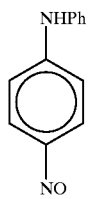
(a)

The organic oxidizing agent or other quencher was employed in the amount of 10 weight % per the amount of the dye.

The coating solution was coated on the surface of a polycarbonate substrate (diameter: 120 mm, thickness: 1.2 mm) to give a coated layer of approx. 200 nm thick. The substrate had a spirally formed pregroove (track pitch: 1.6 μm, groove width: 0.4 μm, depth: 0.17 μm) which was produced in the injection molding of the substrate.

On the coated dye layer was placed a light-reflecting layer made of gold (thickness: approximately 100 μm) by spattering, and then a UV curable photopolymer (UV curable agent: 3070, available from Three-Bond Co., Ltd.) was coated to give a coated layer of 3 μm thick. The coated layer was irradiated with ultra-violet rays to be cured. Thus, information recording media were prepared.

[Evaluation of Information Recording Medium]

(1) On the recording medium rotating at 1.4 m/sec., EFM signals of 3T and 11T were recorded by means of a laser beam of wavelength 780 nm. The laser power was varied between 4 mW and 9 mW. The recorded signals were reproduced by the use of the laser beam having a laser power of 0.5 mW. The modulation factors of the 3T and 11T signals and the groove light-reflections were measured under the optimum power.

(2) The recording medium was exposed to light from Xe lamp (140,000 lux) for 12 hours, 24 hours, or 36 hours. Thereafter, the modulation factors and groove light-reflections were measured in the same manner.

(3) The results are set forth in the following Table 1.

TABLE 1

| Oxidizing Agent | Recording and Reproducing Characteristics | | |
|---|---|---|---|
| | 3T modulation | 11T modulation | Reflection |
| A-98 | | | |
| (none) | 0.495 | 0.805 | 0.689% |
| (12 hrs) | 0.520 | 0.814 | 0.686% |
| (24 hrs) | 0.483 | 0.786 | 0.695% |
| (36 hrs) | 0.448 | 0.74 | 0.696% |
| A-20 | | | |
| (none) | 0.477 | 0.807 | 0.686% |
| (12 hrs) | 0.508 | 0.811 | 0.689% |
| (24 hrs) | 0.469 | 0.779 | 0.694% |
| (36 hrs) | 0.419 | 0.738 | 0.697% |
| A-22 | | | |
| (none) | 0.467 | 0.804 | 0.684% |
| (12 hrs) | 0.512 | 0.81 | 0.686% |
| (24 hrs) | 0.462 | 0.773 | 0.6935% |
| (36 hrs) | 0.413 | 0.735 | 0.701% |
| A-15 | | | |
| (none) | 0.483 | 0.795 | 0.675% |
| (12 hrs) | 0.502 | 0.79 | 0.682% |
| (24 hrs) | 0.453 | 0.762 | 0.7075% |
| (36 hrs) | 0.401 | 0.718 | 0.733% |
| A-8 | | | |
| (none) | 0.471 | 0.794 | 0.68% |
| (12 hrs) | 0.481 | 0.758 | 0.651% |
| (24 hrs) | 0.42 | 0.731 | 0.7195% |
| (36 hrs) | 0.37 | 0.703 | 0.788% |
| A-3 | | | |
| (none) | 0.469 | 0.807 | 0.685% |
| (12 hrs) | 0.473 | 0.76 | 0.653% |
| (24 hrs) | 0.409 | 0.735 | 0.721% |
| (36 hrs) | 0.365 | 0.706 | 0.789% |
| A-58 | | | |
| (none) | 0.480 | 0.798 | 0.669% |
| (12 hrs) | 0.438 | 0.713 | 0.82% |
| (24 hrs) | 0.402 | 0.708 | 0.836% |
| (36 hrs) | 0.360 | 0.682 | 0.85% |
| A-35 | | | |
| (none) | 0.472 | 0.791 | 0.685% |
| (12 hrs) | 0.412 | 0.705 | 0.835% |
| (24 hrs) | 0.386 | 0.691 | 0.855% |
| (36 hrs) | 0.357 | 0.676 | 0.865% |
| A-67 | | | |
| (none) | 0.469 | 0.786 | 0.688% |
| (12 hrs) | 0.397 | 0.704 | 0.836% |
| (24 hrs) | 0.374 | 0.681 | 0.856% |
| (36 hrs) | 0.357 | 0.672 | 0.865% |
| A-41 | | | |
| (none) | 0.473 | 0.792 | 0.684% |
| (12 hrs) | 0.433 | 0.707 | 0.84% |
| (24 hrs) | 0.39 | 0.689 | 0.853% |
| (36 hrs) | 0.357 | 0.67 | 0.866% |
| A-42 | | | |
| (none) | 0.472 | 0.791 | 0.678% |
| (12 hrs) | 0.382 | 0.698 | 0.848% |
| (24 hrs) | 0.359 | 0.68 | 0.8595% |
| (36 hrs) | 0.341 | 0.662 | 0.871% |
| A-44 | | | |
| (none) | 0.467 | 0.788 | 0.685% |
| (12 hrs) | 0.367 | 0.678 | 0.857% |
| (24 hrs) | 0.329 | 0.667 | 0.8695% |
| (36 hrs) | 0.291 | 0.595 | 0.882% |
| A-76 | | | |
| (none) | 0.475 | 0.793 | 0.692% |
| (12 hrs) | 0.352 | 0.681 | 0.866% |
| (24 hrs) | 0.31 | 0.666 | 0.8785% |
| (36 hrs) | 0.28 | 0.565 | 0.891% |

TABLE 1-continued

| Oxidizing Agent | Recording and Reproducing Characteristics | | |
|---|---|---|---|
| | 3T modulation | 11T modulation | Reflection |
| A-47 | | | |
| (none) | 0.477 | 0.796 | 0.687% |
| (12 hrs) | 0.326 | 0.671 | 0.864% |
| (24 hrs) | 0.301 | 0.607 | 0.88% |
| (36 hrs) | 0.276 | 0.543 | 0.896% |
| A-34 | | | |
| (none) | 0.477 | 0.789 | 0.689% |
| (12 hrs) | 0.305 | 0.658 | 0.87% |
| (24 hrs) | 0.279 | 0.5925 | 0.885% |
| (36 hrs) | 0.251 | 0.527 | 0.9% |
| A-85 | | | |
| (none) | 0.476 | 0.792 | 0.688% |
| (12 hrs) | 0.305 | 0.66 | 0.87% |
| (24 hrs) | 0.276 | 0.5955 | 0.8855% |
| (36 hrs) | 0.253 | 0.531 | 0.901% |
| A-87 | | | |
| (none) | 0.469 | 0.79 | 0.686% |
| (12 hrs) | 0.236 | 0.636 | 0.871% |
| (24 hrs) | 0.135 | 0.317 | 0.4355% |
| (36 hrs) | — | — | — |
| A-92 | | | |
| (none) | 0.473 | 0.79 | 0.691% |
| (12 hrs) | 0.253 | 0.617 | 0.879% |
| (24 hrs) | 0.125 | 0.309 | 0.4395% |
| (36 hrs) | — | — | — |
| A-95 | | | |
| (none) | 0.469 | 0.789 | 0.69% |
| (12 hrs) | 0.207 | 0.597 | 0.879% |
| (24 hrs) | 0.104 | 0.299 | 0.4395% |
| (36 hrs) | — | — | — |
| A-90 | | | |
| (none) | 0.470 | 0.791 | 0.684% |
| (12 hrs) | 0.219 | 0.612 | 0.874% |
| (24 hrs) | 0.11 | 0.306 | 0.437% |
| (36 hrs) | — | — | — |
| a (for comparison) | | | |
| (none) | 0.466 | 0.788 | 0.683% |
| (12 hrs) | 0.121 | 0.311 | 0.888% |
| (24 hrs) | — | — | — |
| (36 hrs) | — | — | — |
| None (for comparison) | | | |
| (none) | 0.594 | 0.848 | 0.695% |
| (12 hrs) | — | — | — |
| (24 hrs) | — | — | — |
| (36 hrs) | — | — | — |

Remarks:
(none) means the data before exposure to Xe lamp, and (12 hrs), (24 hrs) and (36 hrs) mean the data after 14 hours exposure, 24 hours exposure and 36 hours exposure, respectively.
— means that the tracking failed.

From the data set forth in Table 1, it is clear that the combination of the cyanine dye of the invention and the specific oxidizing agent of the invention gives high recording and reproducing characteristics and high light-resistance, as compared with the combination of the same cyanine dye and the known quencher (nitroso compound).

EXAMPLE 2

The procedures of Example 1 were repeated except that the cyanine dye of the formula [B-16] was replaced with each of other cyanine dyes of the formulas [B-1], [B-24], [B-39], [B-56], [B-67], and [B-69], to prepare an information recording medium according to the invention.

The same evaluations as that of Example 1 were performed. It was confirmed that almost the same results were obtained.

EXAMPLE 3

The procedures of Example 1 were repeated except that the cyanine dye of the formula [B-16] was replaced with the same amount of the cyanine dye set forth in Table 2 or the known heptamethinecyanine dye of the formula c and that the oxidizing agent was replaced with the oxidizing agent set forth in Table 2, to prepare an information recording medium.

Heptamethinecyanine dye (c)

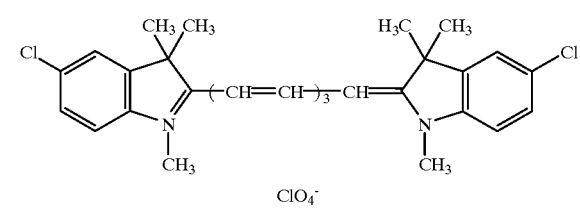

The prepared recording medium was exposed to the same Xe lamp (140,000 lux) for 12 hours. Then, the amount of cyanine dye remaining in the recording layer was measured by a UV and visible ray spectrophotometer. The results are set forth in Table 2.

TABLE 2

| | Organic Dye | Oxidizing Agent Dye | Remaining Ratio |
|---|---|---|---|
| Comparison | Dye c | None | 23% |
| Comparison | Dye c | A-106 | 12% |
| Comparison | Dye c | A-30 | 15% |
| Comparison | Dye c | A-8 | 15% |
| Comparison | Dye c | A-68 | 23% |
| Comparison | Dye c | A-7 | 23% |
| Comparison | B-17 | None | 13% |
| Invention | B-17 | A-106 | 95% |
| Invention | B-17 | A-30 | 94% |
| Invention | B-17 | A-8 | 93% |
| Invention | B-17 | A-68 | 81% |
| Invention | B-17 | A-7 | 70% |
| Comparison | B-22 | None | 28% |
| Invention | B-22 | A-106 | 94% |
| Invention | B-22 | A-30 | 91% |
| Invention | B-22 | A-8 | 90% |
| Invention | B-22 | A-68 | 82% |
| Invention | B-22 | A-7 | 74% |
| Comparison | B-41 | None | 20% |
| Invention | B-41 | A-106 | 93% |
| Invention | B-41 | A-30 | 91% |
| Invention | B-41 | A-8 | 88% |
| Invention | B-41 | A-68 | 80% |
| Invention | B-41 | A-7 | 74% |
| Comparison | B-69 | None | 30% |
| Invention | B-69 | A-106 | 90% |
| Invention | B-69 | A-30 | 84% |
| Invention | B-69 | A-8 | 82% |
| Invention | B-69 | A-68 | 71% |
| Invention | B-69 | A-7 | 66% |

From the results of Table 2, it is confirmed that the combination of the cyanine dye of the invention and the organic oxidizing agent of the formula (A) according to the invention shows extremely decreased deterioration of the dye even after exposure to Xe lamp. In contrast, the combination of the heptamethinecyanine dye (c) and the organic oxidizing agent of the formula (A) shows poor inhibition of the deterioration of the dye after exposure to Xe lamp.

EXAMPLE 4

In 2,2,3,4-tetrafluoropropanol were dissolved the aforementioned cyanine dye of the formula [B-16] (absorption maximum: 670 nm) and the organic oxidizing agent set forth in Table 3. The oxidizing agent was employed in an amount of 10 wt. % per the amount of the dye.

The coating solution was coated on the surface of a polycarbonate substrate (Panlight, tradename of Teijin Co., Ltd., diameter: 120 mm, thickness: 1.2 mm) to give a coated layer of approx. 200 nm thick. The substrate had a spirally formed pregroove (track pitch: 1.6 μm, groove width: 0.4 μm, depth: 0.16 μm) which was produced in the injection molding of the substrate.

On the coated dye layer was placed a light-reflecting layer made of gold (thickness: approximately 130 nm) by spattering, and then a UV curable photopolymer (SD-220, tradename of Dai-nippon Ink and Chemical Industry, Co., Ltd.) was coated to give a coated layer of 8 μm thick. The coated layer was irradiated with ultra-violet rays to be cured. Thus, information recording media were prepared.

[Evaluation of Information Recording Medium]

On the recording medium rotating at 1.4 m/sec., EFM signals of 3T and 11T were recorded by means of a laser beam of wavelength 780 nm. The laser power was varied between 4 mW and 9 mW. The recording medium was then exposed to radiation from Xe-lamp (140,000 lux) for 12 and 18 hours. The recording medium before the light exposure and after the light exposure (12 hrs. or 18 hrs.) was examined in the signal reproduction property (in terms of block error rate) at the optimum laser power in a OTM-2000 (available from Passtick Co., Ltd.), and evaluated in the light-resistance (archival light-resistance).

The results are set forth in Table 3.

TABLE 3

| Oxidizing agent | | | Block Error Rate | | |
|---|---|---|---|---|---|
| | ($P_r$: V) | $P_o - P_r$: V | Before | 12 hrs. Ex. | 18 hrs. Ex. |
| A-8 | (0.14) | 0.50 | 4.3 | 9.8 | fail |
| A-9 | (0.53) | 0.11 | 5.2 | fail | fail* |
| A-25 | (0.10) | 0.54 | 4.2 | 9.7 | fail |
| A-13 | (0.12) | 0.52 | 4.5 | 9.7 | fail |
| A-98 | (−0.09) | 0.73 | 3.7 | 4.2 | 5.6 |
| A-20 | (−0.01) | 0.65 | 2.6 | 3.3 | 3.5 |
| A-31 | (−0.01) | 0.65 | 5.6 | 5.9 | 6.2 |
| A-124 | (−0.42) | 1.05 | 5.1 | 18.2 | fail |
| A-96 | (−0.43) | 1.07 | 4.1 | 17.9 | fail |

Remarks:
$P_r$ means "reduction potential" of the oxidizing agent, and $P_o$ means "oxidation potential" of the cyanine dye. "$P_o - P_r$" means the difference of $P_o$ and $P_r$.
*is a combination for comparison.
"Before", "12 hrs. Ex,", and '18 hrs. Ex." mean "before exposure to the light", "after exposure to the light for 12 hours", and "after exposure to the light for 18 hours", respectively.

The absorption maximum of the organic oxidizing agent and the difference between that and the absorption maximum of the dye are set forth below:

| | Absorption maximum | Difference |
|---|---|---|
| A-8: | 393 nm | 277 nm |
| A-9: | 382 nm | 288 nm |
| A-25: | 411 nm | 259 nm |
| A-13: | 402 nm | 268 nm |
| A-98: | 371 nm | 299 nm |
| A-20: | 429 nm | 241 nm |
| A-31: | 427 nm | 243 nm |
| A-124: | 422 nm | 248 nm |
| A-96: | 341 nm | 329 nm |

Remarks:
The "difference" means the difference of the 670 nm (absorption maximum of the cyanine dye of the formula [B-16]) and the absorption maximum of the oxidizing agent employed.

The results of Table 3 indicate that the combination of the organic dye and the organic oxidizing agent under the conditions that the difference between the oxidation potential of the organic dye and that the reduction potential of the organic oxidizing agent ($P_o-P_r$) is within the condition of $0.4V<P_o-P_r<1.0V$ shows improved archival light-resistances.

What is claimed is:

1. An information recording medium comprising a transparent support, a recording layer on the support which comprises an organic dye having an oxidation potential in terms of $P_o$ and an organic oxidizing agent having a reduction potential in terms of $P_r$ in which the oxidation potential and the reduction potential satisfy the condition of $0.4V<P_o-P_r<1.0V$, and a light-reflecting layer on the recording layer.

2. The information recording medium of claim 1, wherein the reduction potential $P_r$ which satisfies the condition of $-0.2V<P_r<0.2V$.

3. The information recording medium of claim 1, wherein the reduction potential $P_r$ which satisfies the condition of $-0.1V<P_r<0.05V$.

4. The information recording medium of claim 1, wherein the oxidation potential of the organic dye satisfies the condition of $0.4V<P_o<1.0V$.

5. The information recording medium of claim 1, wherein the oxidation potential and the reduction potential satisfy the condition of $0.6V<P_o-P_r<1.0V$.

6. The information recording medium of claim 1, wherein the organic dye has an oxidation potential in terms of $P_o$, which satisfies the condition of $0.6V<P_o-P_r<0.8V$.

7. The information recording medium of claim 1, wherein the organic dye has an oxidation potential in terms of $P_o$, which satisfies the equation of $0.4V<P_o<1.0V$ and the relationship of $0.6V<P_o-P_r<1.0V$.

8. The information recording medium of claim 1, wherein the organic oxidizing agent has the formula:

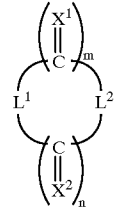

in which each of $X^1$ and $X^2$ independently represents an oxygen atom, a sulfur atom, a =$NR^1$ group, or =$CR^2R^3$, each of $R^1$, $R^2$ and $R^3$ independently being a hydrogen atom, a halogen atom, or a substituent comprising at least two atoms selected from the group consisting of hydrogen, halogen, carbon, oxygen, nitrogen, and sulfur; each of $L^1$ and $L^2$ independently represents a divalent linking group; and each of m and n independently represents an integer of 0 to 3, under the condition of m+n≧2.

9. The information recording medium of claim 1, wherein the organic dye is a cyanine dye having the formula:

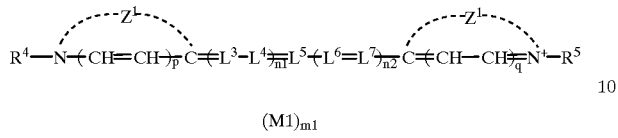

(M1)$_{m1}$ in which each of $Z^1$ and $Z^2$ independently represents a atom groups required for forming a five- or six-membered heterocyclic ring; each of $R^4$ and $R^5$ independently represents an alkyl group; each of $L^3$, $L^4$, $L^5$, $L^6$ and $L^7$ independently represents a methine group; each of n1 and n2 independently represents 0 or 1; each of p and q independently represents 0 or 1; M1 represents a counter ion for neutralizing electric charge; and m1 is a number of more than 0, which is required for neutralizing electric charge of the formula.

10. The information recording medium of claim 1, wherein the organic oxidizing agent has the formula:

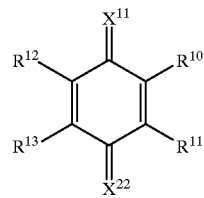

in which each of $X^{11}$ and $X^{12}$ independently represents an oxygen atom, a sulfur atom, a=$NR^1$ group, or =$CR^2R^3$, each of $R^1$, $R^2$ and $R^3$ being a hydrogen atom, a halogen atom, or a substituent comprising at least two atoms selected from the group consisting of hydrogen, halogen, carbon, oxygen, nitrogen, and sulfur; and each of $R^{10}$, $R^{11}$, $R^{12}$ and $R^{13}$ independently being a hydrogen atom, a halogen atom, or a substituent comprising at least two atoms selected from the group consisting of hydrogen, halogen, carbon, oxygen, nitrogen and sulfur, or each set of $R^{10}$ and $R^{11}$ or $R^{12}$ and $R^{13}$ can be combined to form an unsaturated condensed ring.

* * * * *